(12) United States Patent
Hisano et al.

(10) Patent No.: US 12,073,034 B2
(45) Date of Patent: *Aug. 27, 2024

(54) PEN, SENSOR DEVICE, AND PEN SYSTEM

(71) Applicant: Wacom Co., Ltd., Saitama (JP)

(72) Inventors: Haruhiko Hisano, Saitama (JP); Yoshifumi Konda, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/358,761

(22) Filed: Jul. 25, 2023

(65) Prior Publication Data

US 2023/0376129 A1 Nov. 23, 2023

Related U.S. Application Data

(63) Continuation of application No. 17/025,185, filed on Sep. 18, 2020, now Pat. No. 11,747,917, which is a
(Continued)

(51) Int. Cl.
*G06F 3/0354* (2013.01)
*G06F 3/023* (2006.01)
(Continued)

(52) U.S. Cl.
CPC .......... *G06F 3/03545* (2013.01); *G06F 3/023* (2013.01); *G06F 3/0317* (2013.01); *G06F 3/0412* (2013.01); *G06F 3/04162* (2019.05)

(58) Field of Classification Search
CPC .... G06F 3/03545; G06F 3/023; G06F 3/0317; G06F 3/0412; G06F 3/04162; G06F 3/0383

See application file for complete search history.

(56) References Cited

U.S. PATENT DOCUMENTS 5,679,930 A * 10/1997 Katsurahira ............ G06F 3/041
340/8.1
9,448,646 B1 9/2016 Fleck et al.
(Continued)

FOREIGN PATENT DOCUMENTS

JP 3135183 B2 2/2001
JP 2015-201034 A 11/2015
WO 2018/066100 A1 4/2018

OTHER PUBLICATIONS

Dipperstein, "Adaptive Delta Coding Discussion and Implementation," Nov. 23, 2014, 7 pages.
(Continued)

*Primary Examiner* — Jonathan A Boyd
(74) *Attorney, Agent, or Firm* — Seed IP Law Group LLP

(57) ABSTRACT

A pen is configured to supply an N-bit internal digital value NA to a sensor device, and includes an integrated circuit that acquires a series of the internal digital values NA(s) based on a state OPS of a writing pressure detector. The integrated circuit supplies a first internal digital value NA to the sensor device by transmitting, from an antenna, first transmission data MF including a first standard digital value MS corresponding to the first internal digital value NA. The integrated circuit supplies a second internal digital value NA to the sensor device by transmitting, from the antenna, second transmission data MF that is smaller than N bits and includes an M-bit relative digital value (M<N) corresponding to a relative value between the first internal digital value NA obtained by restoration from the first standard digital value MS and the second internal digital value NA.

18 Claims, 18 Drawing Sheets

Related U.S. Application Data continuation of application No. PCT/JP2018/018006, filed on May 9, 2018.

(51) Int. Cl.
*G06F 3/03* (2006.01)
*G06F 3/041* (2006.01)

(56) References Cited

U.S. PATENT DOCUMENTS

| | | |
|---|---|---|
| 10,222,880 B2 | 3/2019 | Hara et al. |
| 2011/0090146 A1* | 4/2011 | Katsurahira ............ G06F 3/046 |
| | | 345/156 |
| 2018/0018031 A1* | 1/2018 | Fleck .................. G06F 3/03547 |
| 2018/0107326 A1 | 4/2018 | Huang et al. |
| 2018/0120962 A1* | 5/2018 | Hara .................... G06F 3/04162 |
| 2018/0157341 A1* | 6/2018 | Oda ...................... G06F 3/0446 |

OTHER PUBLICATIONS

Stojkoska et al. "Data Compression for Energy Efficient IoT Solutions," in *25th Telecommunications forum TELFOR 2017*, Belgrade, Serbia, Nov. 21-22, 2017, 4 pages.

Lemire, "Effective compression using frame-of-reference and delta coding," Feb. 8, 2012, 8 pages.

German Office Action, issued Sep. 16, 2021, for German Application No. 112018007571.0, 19 pages. (with Machine Translation).

* cited by examiner

FIG.5A

| INTERNAL DIGITAL VALUE NA (N BITS) | QUANTIZATION STEP | STANDARD DIGITAL VALUE MS (M BITS) |
|---|---|---|
| 0~15 | 16 | 0 |
| 16~31 | 16 | 1 |
| 32~47 | 16 | 2 |
| 48~63 | 16 | 3 |
| 64~79 | 16 | 4 |
| 80~95 | 16 | 5 |
| ... | ... | ... |
| 4032~4047 | 16 | 252 |
| 4048~4063 | 16 | 253 |
| 4064~4079 | 16 | 254 |
| 4080~4095 | 16 | 255 |

FIG.5B

| INTERNAL DIGITAL VALUE NA (N BITS) | QUANTIZATION STEP | STANDARD DIGITAL VALUE MS (M BITS) |
|---|---|---|
| 0 | 1 | 0 |
| 1 | 1 | 1 |
| 2 | 1 | 2 |
| 3 | 1 | 3 |
| 4 | 1 | 4 |
| 5 | 1 | 5 |
| ... | ... | ... |
| 620~632 | 13 | 100 |
| 633~645 | 13 | 101 |
| 646~658 | 13 | 102 |
| ... | ... | ... |
| 2042~2064 | 23 | 181 |
| 2065~2087 | 23 | 182 |
| 2088~2110 | 23 | 183 |
| 2111~2133 | 23 | 184 |
| ... | ... | ... |
| 3968~3999 | 32 | 252 |
| 4000~4031 | 32 | 253 |
| 4032~4063 | 32 | 254 |
| 4064~4095 | 32 | 255 |

IN CASE OF SETTING RELATIVE DIGITAL VALUE MR AS TRANSMISSION DIGITAL VALUE MD (a) INTERNAL DIGITAL VALUE NA (b) ALREADY-SUPPLIED INTERNAL DIGITAL VALUE NS (c) RELATIVE VALUE (d) TRANSMISSION DIGITAL VALUE MD = RELATIVE DIGITAL VALUE MR (e) TRANSMISSION DATA MF (f) ALREADY-SUPPLIED INTERNAL DIGITAL VALUE NS AFTER TRANSMISSION = RESTORED INTERNAL DIGITAL VALUE NA

EXAMPLE WITH N = 12, M = 7, L = 6
(WITH INTERMEDIATE ACCURACY, WITHOUT PREDICTION ERROR)

EXAMPLE WITH N = 12, M = 7
(WITHOUT INTERMEDIATE ACCURACY, WITH PREDICTION ERROR)

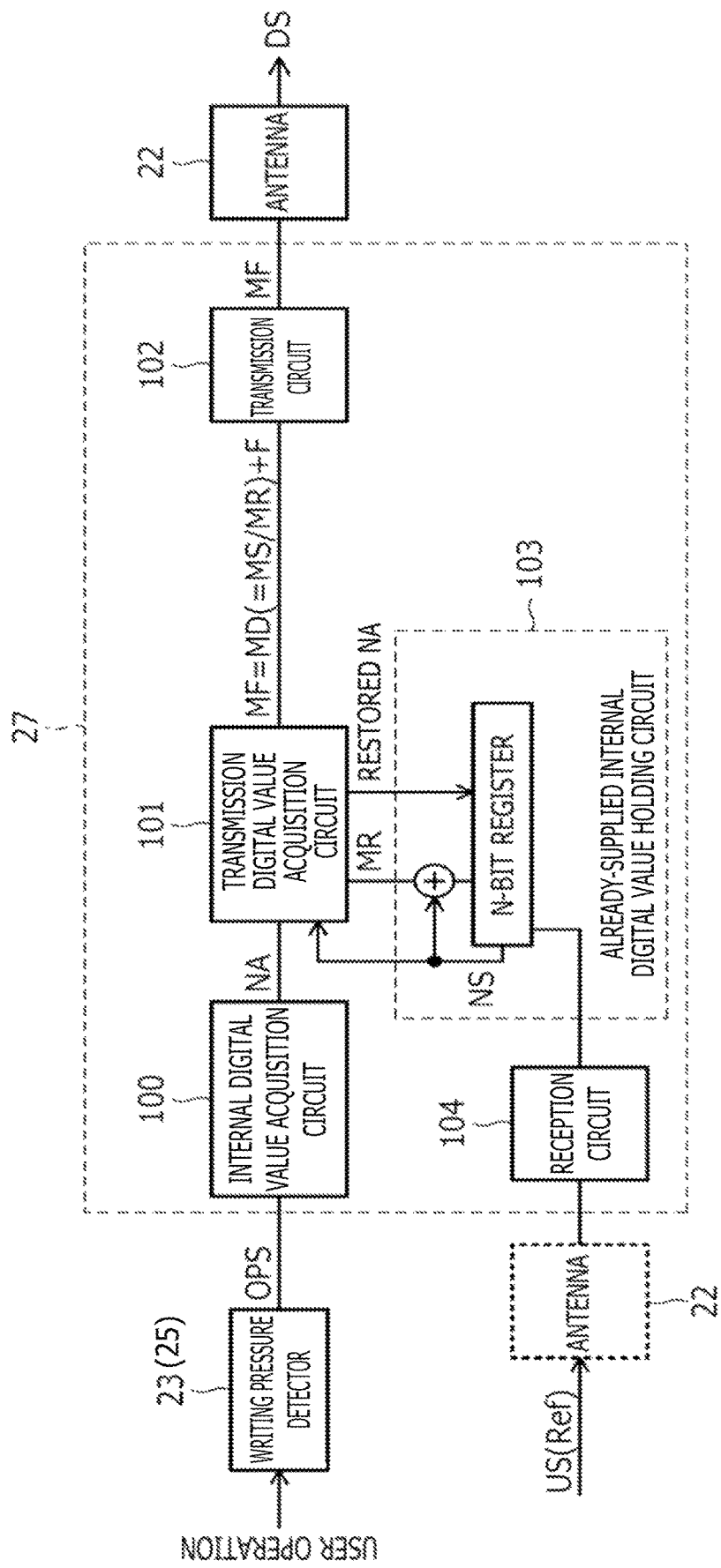
F I G . 22

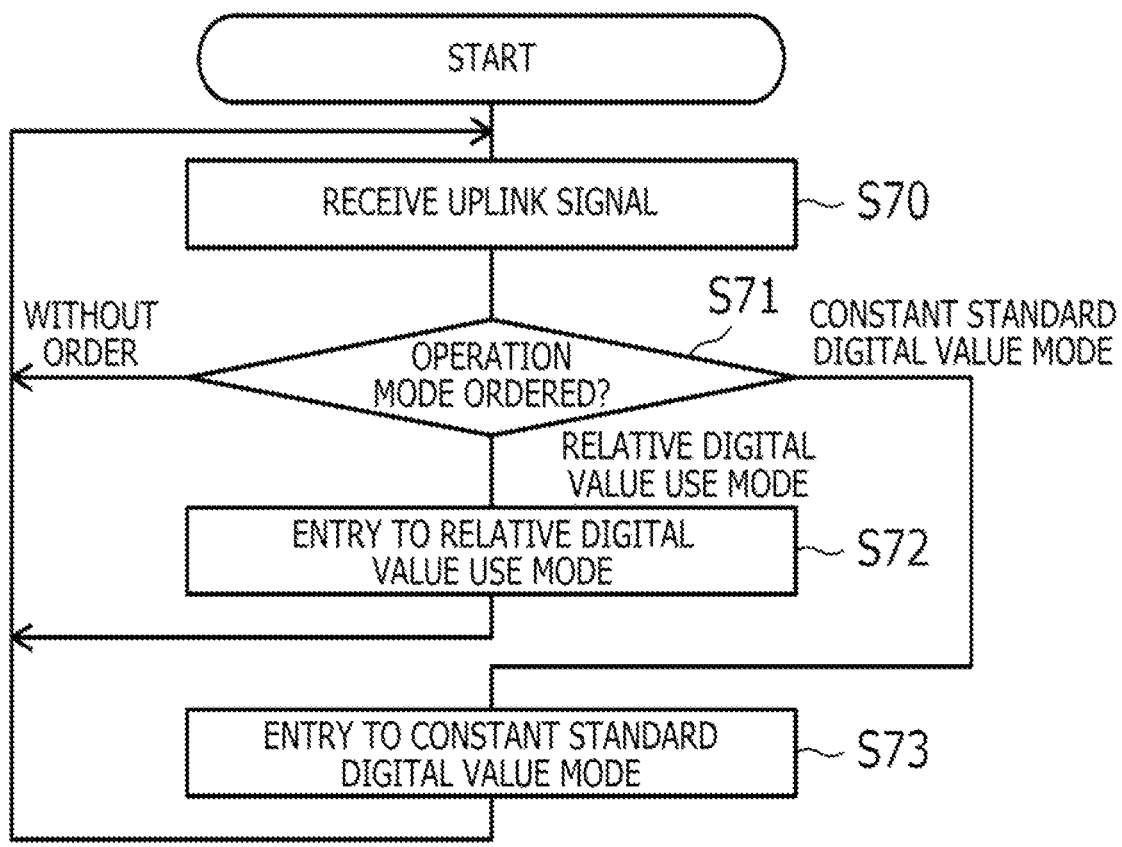

PEN, SENSOR DEVICE, AND PEN SYSTEM

BACKGROUND

Technical Field

The present disclosure relates to a pen, a sensor device, and a pen system, and particularly relates to a pen that transmits a digital value, a sensor device that receives the digital value, and a pen system including the pen and the sensor device.

Description of the Related Art

A pen that transmits a digital value toward a sensor device by changing an alternating current (AC) electric field, AC magnetic field, or AC electromagnetic field is known. For example, in Patent Document 1, a pen that transmits a digital value, which represents information on continuous quantity (for example, a writing pressure) corresponding to a continuous operation, toward a sensor device is disclosed.

Furthermore, a display device is known, in which a touch sensor configuring a sensor device is incorporated based on an in-cell system. In a pen system using this kind of display device, signal transmission from a pen to the sensor device is carried out in a display's non-driving period. However, the time length of the display's non-driving period may be too short to transmit a writing pressure value, which is fixed-length data. Thus, the transmission of the writing pressure value may need to be executed in such a manner as to be divided in plural display's non-driving periods, which exist in a dispersed manner in one frame defined by an uplink signal. In Patent Document 2, a pen system that carries out such divided transmission is disclosed.

PRIOR ART DOCUMENT

Patent Documents

Patent Document 1: Japanese Patent No. 3135183
Patent Document 2: International Publication Pamphlet No. WO 2018/066100

BRIEF SUMMARY

Technical Problem

In recent years, the size of data transmitted from the pen toward the sensor device has been increasing: a writing pressure value is expressed with 8196 grayscale levels, for example. As a result, particularly in a system in which the communication time is limited within the display's non-driving period as in Patent Document 2, or the like, communication resources that can be used for communication between the pen and the sensor device tend to be insufficient and improvement is needed. In addition, in recent years, the multi-pen system that allows simultaneous use of plural pens has been widespread and communication resources are becoming scarce.

According to one aspect of the present disclosure, a pen, a sensor device, and a pen system are provided that can alleviate insufficiency of communication resources used for communication between a pen and a sensor device.

Technical Solution

A pen according to a first aspect of the present disclosure is a pen that supplies an N-bit internal digital value to a sensor device. The pen includes a writing pressure detector that detects a force applied to a pen tip, an antenna, and an integrated circuit that is connected to the writing pressure detector and the antenna and that acquires a series of the internal digital values based on a state of the writing pressure detector. The series of the internal digital values includes a first internal digital value and a second internal digital value acquired subsequently to the first internal digital value. The integrated circuit supplies the first internal digital value to the sensor device by transmitting, from the antenna, first transmission data including a first standard digital value corresponding to the first internal digital value. The integrated circuit supplies the second internal digital value to the sensor device by transmitting, from the antenna, second transmission data that is smaller than N bits and includes an M-bit relative digital value (M<N) corresponding to a relative value between the first internal digital value, which can be restored from the first standard digital value, and the second internal digital value.

A sensor device according to the first aspect of the present disclosure is a sensor device that receives supply of a series of internal digital values each composed of N bits from a pen configured to acquire the series of internal digital values based on a force applied to a pen tip. The series of internal digital values include a first internal digital value and a second internal digital value acquired subsequently to the first internal digital value. When receiving first transmission data including a first standard digital value corresponding to the first internal digital value from the pen, the sensor device restores the first internal digital value from the first transmission data and stores the first internal digital value in an internal memory. When receiving, from the pen, second transmission data that is smaller than N bits and includes an M-bit relative digital value (M<N) corresponding to a relative value between the first internal digital value, which is restored from the first standard digital value, and the second internal digital value, the sensor device restores the second internal digital value from the second transmission data by using the value stored in the internal memory.

A pen according to a second aspect of the present disclosure is a pen that supplies an N-bit internal digital value to a sensor device. The pen includes an antenna and an integrated circuit that is connected to a user operation tool and the antenna and that acquires a series of the internal digital values. The integrated circuit receives a reference value corresponding to the internal digital value that has been already supplied from the sensor device and supplies a first internal digital value included in the series of the internal digital values to the sensor device by transmitting, from the antenna, transmission data that is smaller than N bits and includes an M-bit relative digital value (M<N) corresponding to a relative value between the first internal digital value and the reference value.

A sensor device according to the second aspect of the present disclosure is a sensor device that receives supply of a series of internal digital values each composed of N bits from a pen configured to acquire the series of internal digital values based on a force applied to a pen tip. The sensor device transmits a reference value to the pen. When receiving, from the pen, transmission data that is smaller than N bits and includes an M-bit relative digital value (M<N) corresponding to a relative value between a first internal digital value included in the series of internal digital values and the reference value, the sensor device restores the first internal digital value from the transmission data by using the reference value.

A pen system according to the present disclosure is a pen system that includes a pen and a device and that outputs an N-bit internal digital value. The pen includes a writing pressure detector that detects a force applied to a pen tip, an antenna, and an integrated circuit that is connected to the writing pressure detector and the antenna and that acquires a series of the internal digital values based on a state of the writing pressure detector. The integrated circuit supplies a first internal digital value included in the series of the internal digital values to the sensor device by transmitting, from the antenna, first transmission data including a standard digital value. The reference digital value is obtained by compressing the first internal digital value using a compression method, in which a quantization step becomes smaller when a value of the internal digital value is smaller. The device is configured to restore the first internal digital value from the first transmission data and to output the first internal digital value.

Advantageous Effect

According to the first aspect of the present disclosure, the N-bit internal digital value can be supplied using the transmission data that is smaller than N bits. Thus, it becomes possible to alleviate insufficiency of communication resources that can be used for communication between the pen and the sensor device.

According to the second aspect of the present disclosure, even when a discrepancy occurs between the internal digital value acquired by the pen and the internal digital value acquired by the sensor device due to a communication error or the like, the error can be eliminated once the reference value is transmitted and received.

According to the pen system in accordance with the present disclosure, it becomes possible to reduce the possibility that the user senses an error that possibly occurs at the time of transmission of the standard digital value.

BRIEF DESCRIPTION OF DRAWINGS

FIGS. 5A and 5B are each a diagram illustrating one example of a compression method of the internal digital value NA.

FIG. 22 is a schematic block diagram illustrating functional blocks of the integrated circuit according to the fourth embodiment of the present disclosure.

FIG. 23 is a flowchart illustrating a processing executed by the integrated circuit according to a fifth embodiment of the present disclosure.

DETAILED DESCRIPTION

Embodiments of the present disclosure will be described in detail below with reference to the accompanying drawings.

Figure 1:
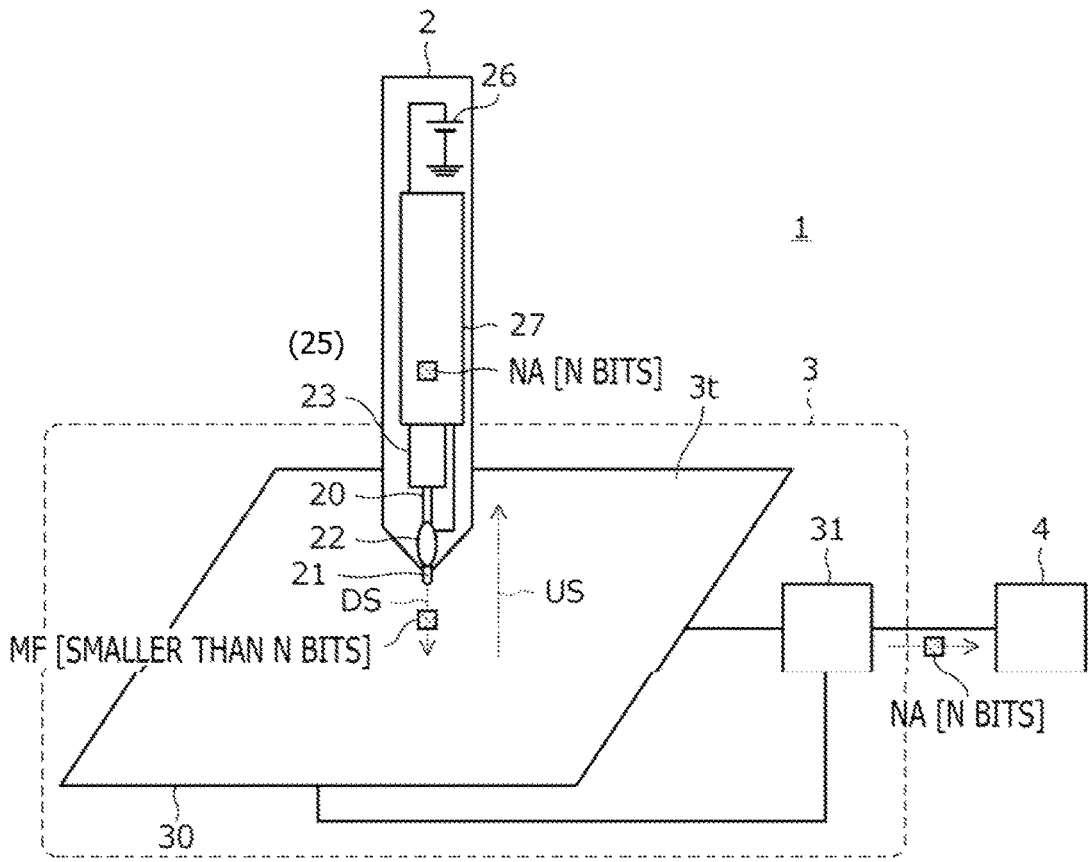
FIG. 1 is a diagram illustrating the system configuration of a pen system according to a first embodiment of the present disclosure.

FIG. 1 is a diagram illustrating the system configuration of a pen system 1 according to a first embodiment of the present disclosure. As illustrated in this diagram, the pen system 1 according to the present embodiment is configured to have a pen 2, a sensor device 3, and a host computer 4. Among them, the host computer 4 may be any of various types of computer such as a tablet type computer, a notebook type computer, and a desktop type computer.

The sensor device 3 is a position detecting device compatible with various systems such as active electrostatic (ES) system, electromagnetic resonance (EMR) system, pressure sensing system, and is configured to have a sensor 30, which forms a touch surface 3t, and a sensor controller 31 that is an integrated circuit. Although diagrammatic representation is not made, the sensor 30 has a configuration in which plural electrodes are disposed in the touch surface 3t. The sensor controller 31 detects the position of the pen 2 in the touch surface 3t by using these electrodes. In addition, the sensor controller 31 receives, through these electrodes, data transmitted from the pen 2 by receiving a signal transmitted from the pen 2 (hereinafter referred to as a "downlink signal DS").

The case in which the sensor device 3 is compatible with the active ES system or electromagnetic resonance (EMR)

system will be specifically described. In the downlink signal DS, an unmodulated burst signal and a data signal obtained by modulation with various kinds of data are included. The burst signal is a signal used for detection of the position of the pen 2 in (on) the touch surface 3*t* by the sensor controller 31. The sensor controller 31 determines the electrode by which the burst signal has been received by sequentially scanning the plural electrodes configuring the sensor 30, and detects the position of the pen 2 based on the result thereof. The data signal is a signal including various internal digital values acquired by the pen 2 (a writing pressure value, a wheel indication value, and so forth acquired by a user operation tool 25 to be described later). The sensor controller 31 receives data transmitted from the pen 2 by using the electrode, which is closest to the position of the pen 2 in the plural electrodes forming the sensor 30, as an antenna and receiving the data signal.

Signal transmission from the sensor controller 31 to the pen 2 may also be allowed. Hereinafter, the signal thus transmitted will be referred to as "uplink signal US." The sensor controller 31 uses the plural electrodes forming the sensor 30 as the transmitting antenna and transmits the uplink signal US.

An instruction (or a command) from the sensor controller 31 to the pen 2 can be included in the uplink signal US. The pen 2 determines the transmission timing of the downlink signal DS based on the timing when the uplink signal US is received. In addition, the pen 2 determines the kind of internal digital value transmitted in the downlink signal DS based on the command included in the uplink signal US.

The sensor controller 31 supplies the detected position and the received data to the host computer 4. The host computer 4 generates and stores stroke data indicating the trace formed by the pen 2 based on the series of positions and signals thus supplied, and carries out rendering of the stored stroke data.

In the present embodiment, a description will be made based on the assumption that the uplink signal US and the downlink signal DS are transmitted and received through the sensor 30. However, the uplink signal US may be transmitted and received by another communication system (for example, Bluetooth (registered trademark), wireless LAN, or the like).

In one example, the sensor 30 is incorporated in a display device of the host computer 4, which may be a tablet type computer based on the in-cell system. In this case, in order to avoid the influence of noise generated due to pixel driving carried out in the display device, transmission and reception of the uplink signal US and the downlink signal DS may be carried out during the display's non-driving period such as the vertical blanking period or horizontal blanking period of a liquid crystal display device, for example. Because the transmission and reception of the uplink signal US and the downlink signal DS are not carried out during the display's driving period, communication resources that can be used for communication between the pen 2 and the sensor device 3 are significantly limited.

Here, between the pen 2 and the sensor device 3 having the sensor 30 incorporated in the display device based on the in-cell system, normally communication is carried out based on frame communication in which plural time slots (=the display's non-driving periods) are included in one frame. In this case, the time slot used for transmission of the uplink signal US is configured separately from the time slot used for transmission of the downlink signal DS, in advance. Therefore, even when a reference value Ref is transmitted by the uplink signal US as described in a fourth embodiment, such uplink transmission does not interfere with the transmission of the downlink signal DS.

The pen 2 is an electronic pen compatible with the same system as the sensor device 3 (for example, active electrostatic (ES) system or electromagnetic resonance (EMR) system) and is configured to have a core body 20, an antenna 22, a writing pressure detector 23, a power supply 26, and an integrated circuit 27.

The core body 20 is a bar-shaped member disposed in such a manner that its longitudinal direction corresponds with the pan axis direction of the pen 2, and its one end forms a pen tip 21 of the pen 2. An electrically-conductive material is applied to the surface of the core body 20, which forms the antenna 22.

The antenna 22 is an electrical conductor disposed near the core body 20 and is electrically connected to the integrated circuit 27 by a wiring line. The integrated circuit 27 carries out reception of the above-described uplink signal US and transmission of the downlink signal DS through this antenna 22. Signals other than the above-described burst signal may be transmitted and received by using an antenna other than the antenna 22 (not illustrated, for example, a built-in antenna for Bluetooth (registered trademark)). Furthermore, the antenna 22 may be separated into an antenna for transmission and an antenna for reception.

The writing pressure detector 23 is a functional unit that detects a force (a writing pressure) applied to the pen tip 21. Specifically, the writing pressure detector 23 abuts against the rear end part of the core body 20 and is configured to detect, through this abutting, the force applied to the pen tip 21 when the user presses the pen tip of the pen 2 against the touch surface 3*t* or the like. In a specific example, the writing pressure detector 23 is formed of a variable-capacitance module whose capacitance changes according to the force applied to the pen tip 21.

Here, it can be said that the writing pressure detector 23 is a user operation tool that detects the amount of operation by the user (specifically, a magnitude of the force with which the user presses the touch surface 3*t*), and the pen 2 can include such user operation tool 25 besides the writing pressure detector 23. For example, the pen 2 may include a wheel that can be rotated by the user, or a wheel operation tool that detects the amount of rotation of the wheel.

The power supply 26 is a component for supplying operating power (direct-current voltage) to the integrated circuit 27 and is formed of an AAAA battery with a cylindrical shape, for example.

The integrated circuit 27 is a processing unit formed of a circuit group formed on a board that is not illustrated, and is connected to the user operation tool 25 and the antenna 22. If an antenna other than the antenna 22 is used for reception of the uplink signal US or transmission of the downlink signal DS, the integrated circuit 27 is connected also to such antenna. The integrated circuit 27 is responsible for acquiring a series of internal digital values NA(s) each composed of N bits based on a state of the writing pressure detector 23 (or a state of another user operation tool) and sequentially supplying the internal digital values NA(s) to the sensor device 3 by using the downlink signal DS. However, when the internal digital values NA(s) are transmitted using the number of bits N as is, there is a possibility that communication resources may become insufficient. Thus, as illustrated in FIG. 1, a configuration is made such that the internal digital values NA(s) are transmitted after being converted to transmission data MF that is smaller than N bits. A characteristic of the present embodiment is that the pen 2 and the sensor device 3 are configured in such a manner that, although the integrated circuit 27 transmits the transmission data MF smaller than N bits, the original N-bit internal digital value NA can be restored in the sensor device 3 and the N-bit internal digital value NA can be provided to the host computer 4. This point will be described in detail below.

Figure 2:
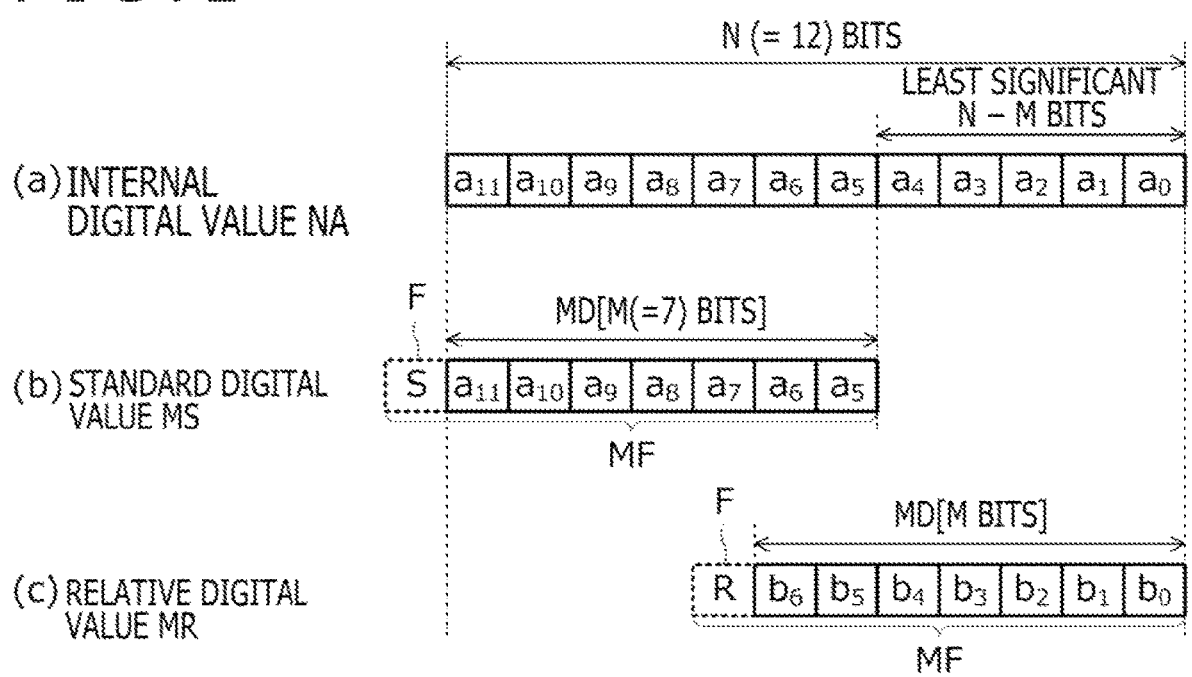
FIG. 2 is a diagram explaining the principle of the first embodiment of the present disclosure.

First, FIG. 2 is a diagram explaining the principle of the present embodiment. The integrated circuit 27 is configured to, in transmitting the N-bit internal digital value NA, transmit the transmission data MF of M+1 bits, instead of the internal digital value NA itself. The transmission data MR includes an M-bit (M<N−1) transmission digital value MD, which is either of a standard digital value MS or a relative digital value MR as illustrated in FIG. 2, and a one-bit identification flag F indicating the kind of transmission digital value MD.

The standard digital value MS is a value corresponding to the internal digital value NA and, specifically, is formed of an M-bit digital value obtained by compressing the internal digital value NA. This compression is carried out by discarding the least significant N−M bits of the internal digital value NA in the example of FIG. 2. However, it is also possible to obtain the standard digital value MS by another compression method as described later.

The relative digital value MR is an M-bit digital value corresponding to the relative value between the internal digital value NA, which is being supplied, and the internal digital value NA, which has been already supplied to the sensor device 3. The internal digital value NA that has been already supplied means the internal digital value NA restored from the transmission digital value MD that has been actually transmitted, and is the same as the internal digital value NA restored by the sensor device 3 that has received this transmission digital value MD (as long as a communication error to be described later does not exist). The relative value may be the difference between the internal digital value NA, which is being supplied, and the internal digital value NA that has been already supplied to the sensor device 3, for example.

As described in detail later, the integrated circuit 27 is configured to set the standard digital value MS as the transmission digital value MD, in a case where communication has just started and so the internal digital value NA has not been supplied yet, or in a case where the internal digital value NA is what can be restored from the standard digital value MS without an error (for example, in a case where the N−M least significant bits of the internal digital value NA are all 0), or in a case where the relative value cannot be expressed with M bits. The integrated circuit 27 is configured to set the relative digital value MR as the transmission digital value MD, in a case where the internal digital value NA that has been already supplied exists and the internal digital value NA is not what can be restored from the standard digital value MS without an error (for example, the N−M least significant bits of the internal digital value NA include a bit that is not 0) and the relative value can be expressed with M bits. The case in which the relative value cannot be expressed with M bits corresponds to the case in which the relative value is not in a range of $-2^{M-1}+2^{M-1}-1$, for example, where a negative digital value is expressed by using a two's complement.

When receiving the transmission data MF smaller than N bits from the pen 2, first, the sensor controller 31 determines which of the standard digital value MS or the relative digital value MR is included in the transmission data MF based on the identification flag F. If it is determined that the transmission data MF includes the standard digital value MS, the internal digital value NA is restored from the transmission digital value MD (=the standard digital value MS) and the restored internal digital value NA is stored in an internal memory, which is not illustrated. In the example of FIG. 2, this restoration is carried out by complementing the N−M least significant bits with a predetermined value (for example, 0). In this case, an error corresponding to up to N−M bits possibly occurs.

On the other hand, when determining that the transmission data MF includes the relative digital value MR, the sensor controller 31 is configured to restore the internal digital value NA from the transmission digital value MD (=the relative digital value MR) by using the value stored in the internal memory and to store the restored internal digital value NA in the internal memory. If the relative digital value MR is composed of the difference between the internal digital value NA being supplied and the internal digital value NA that has been already supplied to the sensor device 3 as in the above-described example, this restoration is carried out by adding the value stored in the internal memory and the received relative digital value MR. The internal digital value NA restored from the relative digital value MR is data that does not include an error and maintains an accuracy of N bits, as long as the transmission data MF is not lost due to a communication error or the like.

As above, according to the present embodiment, the N-bit internal digital value NA can be supplied with the transmission data MF smaller than N bits (specifically, with M+1 bits). Furthermore, although a certain level of error possibly occurs when the standard digital value MS is transmitted, this error can be eliminated by the relative digital value MR which immediately follows and, therefore, does not become a substantial problem. In addition, an error attributed to transmission of the standard digital value MS occurs when the relative value is large, i.e., when a change in the internal digital value NA is large. In such a case, even when a certain degree of error exists, the impact on the perception of a human user is limited (as compared with the case in which a change in the internal digital value NA is small). Therefore, according to the present embodiment, it becomes possible to alleviate insufficiency (or shortage) of communication resources that can be used for communication between the pen 2 and the sensor device 3. A specific configuration to supply such internal digital value NA will be described in detail below.

Figure 3:
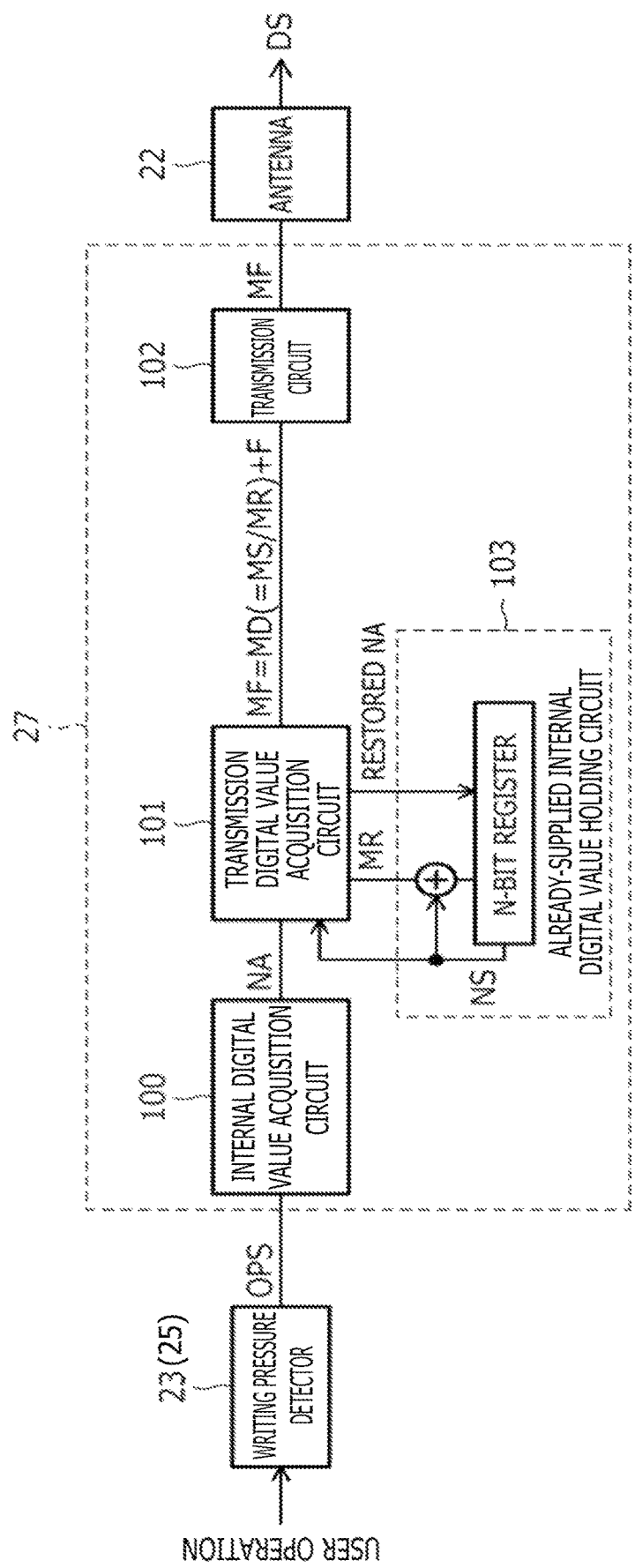
FIG. 3 is a schematic block diagram illustrating functional blocks of an integrated circuit.

FIG. 3 is a schematic block diagram illustrating functional blocks of the integrated circuit 27. As illustrated in FIG. 3, the integrated circuit 27 is configured to functionally include an internal digital value acquisition circuit 100, a transmission digital value acquisition circuit 101, a transmission circuit 102, and an already-supplied internal digital value holding circuit 103.

The internal digital value acquisition circuit 100 is a functional unit that sequentially converts a state OPS of the writing pressure detector 23 (or a state of another user operation tool 25) to the N-bit internal digital value. The internal digital value acquisition circuit 100 sequentially supplies a series of internal digital values NA(s) acquired by the conversion to the transmission digital value acquisition circuit 101.

The transmission digital value acquisition circuit 101 is a functional unit that generates the transmission data MF including the transmission digital value MD and the identification flag F based on the internal digital value NA supplied from the internal digital value acquisition circuit 100 and supplies the transmission data MF to the transmission circuit 102. The transmission digital value acquisition circuit 101, in response to the internal digital value NA that is newly supplied, determines which of the standard digital value MS or the relative digital value MR is to be set as the next transmission digital value MD to be transmitted based on the internal digital value NA, and generates the transmission data MF including either of the standard digital value MS or the relative digital value MR based on the determination result.

This determination is composed of two determinations. The first determination is a determination of whether or not the internal digital value NA is what can be restored from the standard digital value MS without an error. The transmission digital value acquisition circuit 101, which has determined that the internal digital value NA can be restored without an error, acquires the standard digital value MS corresponding to the internal digital value NA and sets the reference digital value MS as the transmission digital value MD to be transmitted next.

The second determination is a determination of whether or not the relative value between an already-supplied internal digital value NS held in the already-supplied internal digital value holding circuit 103 and the internal digital value NA being supplied can be expressed with M bits, and is carried out in response to determining that the internal digital value NA cannot be restored without an error in the first determination. When determining that the relative value cannot be expressed with M bits, the transmission digital value acquisition circuit 101 acquires the standard digital value MS corresponding to the internal digital value NA and sets the reference digital value MS as the transmission digital value MD to be transmitted next. On the other hand, when determining that the relative value can be expressed with M bits, the transmission digital value acquisition circuit 101 acquires the relative value as the relative digital value MR and sets the relative digital value MR as the transmission digital value MD to be transmitted next.

The transmission digital value acquisition circuit 101 may further carry out, before the first determination, a determination of whether the already-supplied internal digital value holding circuit 103 holds a value (for example, 0 if the internal digital value NA is the writing pressure) indicating that, after the last pen-up (separation of the pen tip 21 from the touch surface 3t), the standard digital value MS has never been transmitted. If the result of this determination is positive, the transmission digital value acquisition circuit 101 may set the standard digital value MS as the transmission digital value MD to be transmitted next irrespective of the above-described two determinations. This makes it possible to prevent the situation in which the relative digital value MR is transmitted without the standard digital value MS being transmitted at the time of pen-down (contact of the pen tip 21 with the touch surface 3t).

The already-supplied internal digital value holding circuit 103 is a functional unit configured to include one or more N-bit registers and is responsible for holding the already-supplied internal digital value NS. The specific held content of the already-supplied internal digital value NS depends on the content of the transmission digital value MD generated by the transmission digital value acquisition circuit 101. For example, if the transmission digital value acquisition circuit 101 sets the standard digital value MS as the transmission digital value MD, the internal digital value NA restored from the standard digital value MS (this internal digital value NA does not necessarily correspond with the internal digital value NA acquired by the internal digital value acquisition circuit 100) is set in the already-supplied internal digital value holding circuit 103. On the other hand, if the transmission digital value acquisition circuit 101 sets the relative digital value MR as the transmission digital value MD, the internal digital value NA restored from the relative digital value MR by use of the already-supplied internal digital value NS held in the already-supplied internal digital value holding circuit 103 is set in the already-supplied internal digital value holding circuit 103. In this case, the restored internal digital value NA precisely corresponds with the internal digital value NA acquired by the internal digital value acquisition circuit 100. Thus, instead of the restored internal digital value NA, the internal digital value NA acquired by the internal digital value acquisition circuit 100 may be set in the already-supplied internal digital value holding circuit 103.

The acquisition of the internal digital value NA by the internal digital value acquisition circuit 100 is not always carried out, but carried out only when the internal digital value NA needs to be supplied to the sensor device 3 (for example, when the pen 2 is detecting the sensor device 3). The operation of the transmission digital value acquisition circuit 101 is carried out in response to supply of the new internal digital value NA from the internal digital value acquisition circuit 100. Therefore, depending on a case, the held content of the already-supplied internal digital value holding circuit 103 may be not updated for a long time. Thus, the already-supplied internal digital value holding circuit 103 may be configured to autonomously delete the held content when the held content is not updated over a predetermined time.

The transmission circuit 102 is a functional unit that transmits, to the sensor device 3 through the antenna 22, the transmission data MF supplied from the transmission digital value acquisition circuit 101 as part of a data signal which forms the downlink signal DS.

Figure 4:
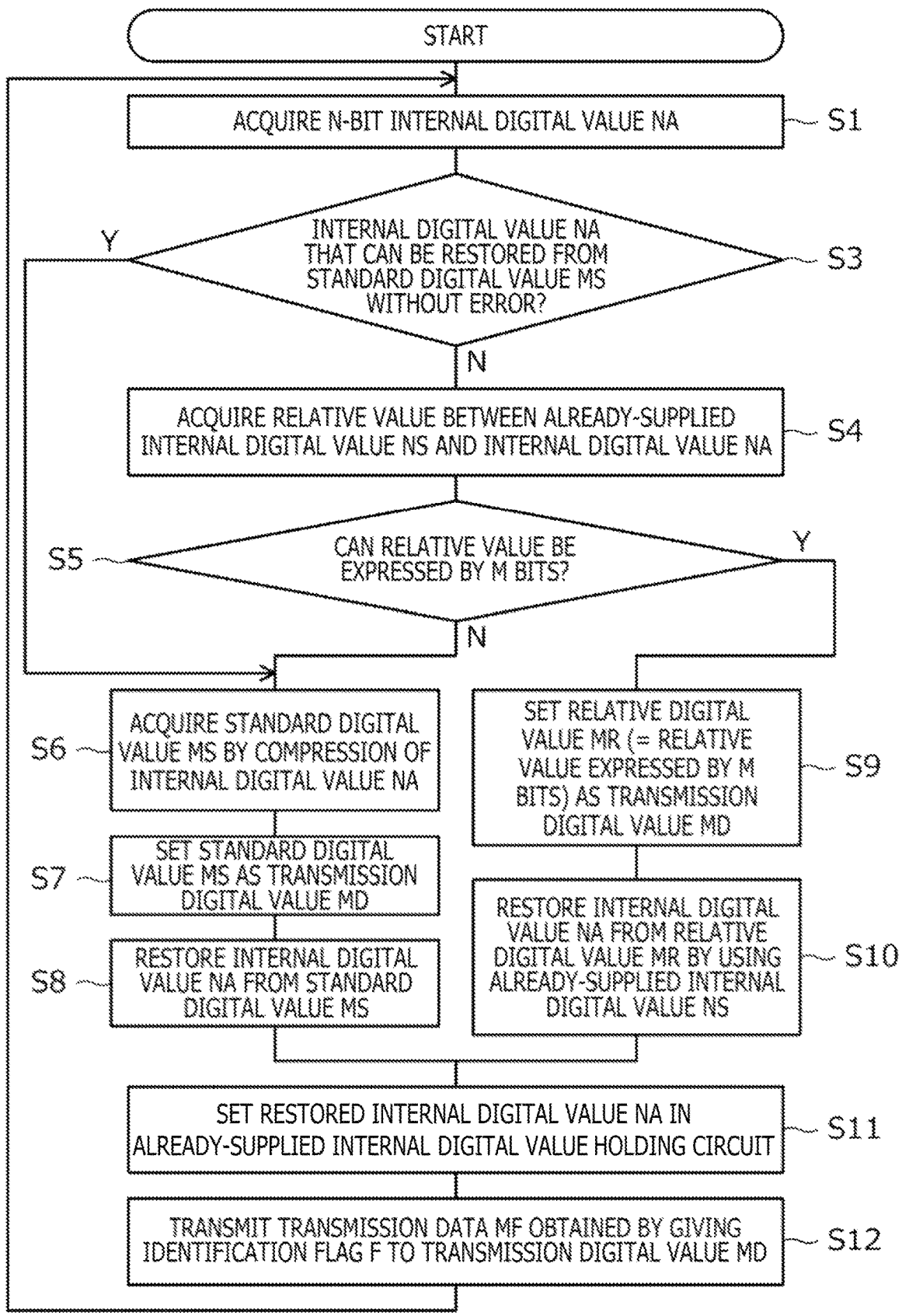
FIG. 4 is a flowchart illustrating a transmission processing of an internal digital value NA executed by the integrated circuit.

FIG. 4 is a flowchart illustrating a transmission processing of the internal digital value NA executed by the integrated circuit 27. With reference to this diagram, the transmission processing of the internal digital value NA executed by the integrated circuit 27 will be described more specifically below.

First, the integrated circuit 27 acquires the N-bit internal digital value NA based on the state OPS (see FIG. 3) of the user operation tool 25 (step S1). Subsequently, the integrated circuit 27 determines whether or not the internal digital value NA acquired in step S1 is what can be restored from the standard digital value MS without an error (step S3). This processing may be executed after step S5 to be described later. As in the example of FIG. 2, when the standard digital value MS is composed of the M most significant bits of the internal digital value NA and the sensor device 3 is configured to restore the internal digital value NA from the standard digital value MS by complementing the N–M least significant bits with a predetermined value (for example, 0), the result of this determination becomes positive if the N–M least significant bits of the internal digital value NA are all 0, and becomes negative if not so. When determining that the internal digital value NA can be restored without an error in this determination, the integrated circuit 27 moves the processing to step S6 irrespective of the relative value acquired in step S4 to be described later. When determining that the internal digital value NA cannot be restored without an error, the integrated circuit 27 moves the processing to step S4.

In step S4, the integrated circuit 27 acquires the relative value between the already-supplied internal digital value NS and the internal digital value NA acquired in step S1 (step S4). The relative value acquired here is the difference between the already-supplied internal digital value NS and the internal digital value NA acquired in step S1 as described above, for example. Then, the integrated circuit 27 determines whether or not the acquired relative value is a numerical value that can be expressed with M bits (step S5). When determining that the relative value cannot be expressed in this determination, the integrated circuit 27 moves the processing to step S6. When determining that the relative value can be so expressed, the integrated circuit 27 moves the processing to step S9.

In step S6, the integrated circuit 27 acquires the M-bit standard digital value MS by compressing the internal digital value NA (step S6). This compression is processing of extracting the M most significant bits of the internal digital value NA to make the standard digital value MS as described above, for example.

With reference to FIG. 5, the compression method of the internal digital value NA will be described in more detail.

FIGS. 5A and 5B are each a diagram illustrating one example of the compression method of the internal digital value NA. In these diagrams, examples of N=12 and M=8 are illustrated. Both compression methods are processing of converting a discrete value expressed with a relatively-large number of bits (the internal digital value NA) to a discrete value expressed with a relatively-small number of bits (the standard digital value MS).

The compression method illustrated in FIG. 5A is a method in which $2^N$ kinds of internal digital values NA(s) that can be expressed with N bits are separated into total $2^M$ ranges (hereinafter, the size of this range will be referred to as "quantization step") in units of $2^{N-M}$ values sequentially from the smallest value, and in which the value of the standard digital value MS is allocated to each range. This compression method is a processing of extracting the M most significant bits of the internal digital value NA to make the standard digital value MS. Therefore, when employing the compression method illustrated in FIG. 5A, it is preferable that the integrated circuit 27 be configured to acquire the standard digital value MS using the processing of extracting the M most significant bits of the internal digital value NA. Furthermore, it is preferable for the sensor device 3 that has received the standard digital value MS to restore the internal digital value NA by complementing the N−M least significant bits with a predetermined value (for example, 0) as described above.

The compression method illustrated in FIG. 5B is the same as the compression method illustrated in FIG. 5A in that $2^N$ kinds of internal digital values NA(s) are separated into $2^M$ ranges sequentially from the smallest value and the value of the standard digital value MS is allocated to each range. However, the compression method illustrated in FIG. 5B is different from the compression method illustrated in FIG. 5A in that the boundaries of the ranges are adjusted in such a manner that the quantization step becomes smaller when the value of the internal digital value NA is smaller. In FIG. 5B, the example is illustrated in which the quantization step when the internal digital value NA is 0 to 5 is set to 1, and the quantization step when the internal digital value NA is 620 to 658 is set to 13, and the quantization step when the internal digital value NA is 2042 to 2133 is set to 23, and the quantization step when the internal digital value NA is 3968 to 4095 is set to 32. Regarding the intermediate internal digital values NA(s) that are not illustrated in the diagram, it is preferable to set the quantization step in such a manner that the quantization step rises in a stepwise manner in association with the rise of the internal digital value NA.

When employing the compression method illustrated in FIG. 5B, it is preferable that the integrated circuit 27 be configured to store, in advance, a table that associates the standard digital value MS with each internal digital value NA and to convert the internal digital value NA to the standard digital value MS by referring to this table. Furthermore, regarding the sensor device 3 that has received the standard digital value MS, it is preferable that the sensor device 3 be configured to store, in advance, a table that associates one of the plural values belonging to the corresponding range of the internal digital value NA (for example, median or maximum value) with each standard digital value MS and to restore the internal digital value NA from the standard digital value MS by referring to this table.

Using either the compression method of FIG. 5A or the compression method of FIG. 5B, the N-bit internal digital value NA is compressed to the M-bit standard digital value MS. However, according to the compression method of FIG. 5B, the compression rate of the standard digital value MS when the internal digital value NA is small can be made low compared with the compression method of FIG. 5A. Such a compression method of FIG. 5B is particularly advantageous when the internal digital value NA is that which represents the writing pressure value. Specifically, the writing pressure value has a characteristic that the user becomes more sensitive to an error when the value becomes smaller. According to the compression method of FIG. 5B, the compression rate of the standard digital value MS can be made lower when the writing pressure value is smaller (i.e., the internal digital value NA is smaller). Therefore, according to the compression method of FIG. 5B, it becomes possible to reduce the possibility that the user notices an error that possibly occurs at the time of transmission of the standard digital value MS.

Referring back to FIG. 4, the integrated circuit 27 that has acquired the standard digital value MS in step S6 sets the acquired standard digital value MS as the transmission digital value MD (step S7). In addition, the integrated circuit 27 restores the internal digital value NA from the standard digital value MS (step S8). This restoration is carried out by the same method as the restoration carried out by the sensor device 3.

The integrated circuit 27, when the processing is forwarded to step S9, sets the relative digital value MR that is the relative value expressed with M bits as the transmission digital value MD (step S9). In addition, the integrated circuit 27 restores the internal digital value NA from the relative digital value MR by using the already-supplied internal digital value NS (step S10). This restoration is also carried out by the same method as the restoration carried out by the sensor device 3.

The integrated circuit 27 that has carried out step S8 or step S10 subsequently sets the restored internal digital value NA in the already-supplied internal digital value holding circuit 103 (step S11). Then, the integrated circuit 27 transmits the transmission data MF, which is obtained by adding the identification flag F according to the value set in the transmission digital value MD to the transmission digital value MD (step S12), and returns to step S1 to continue the processing.

Figure 6:
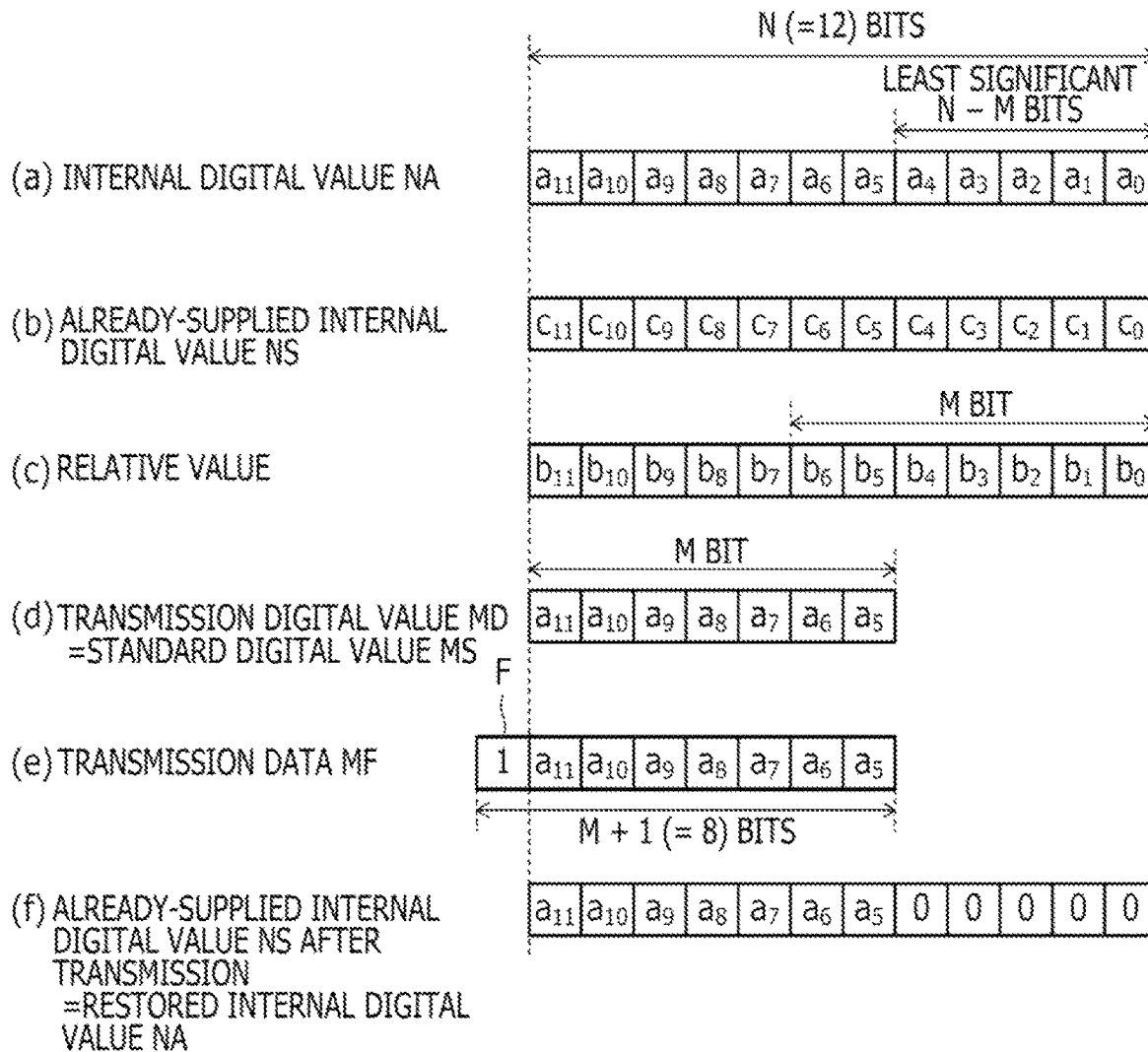
FIG. 6 is a diagram illustrating a specific example of the respective values used in the process of the processing illustrated in FIG. 4.
Figure 7:
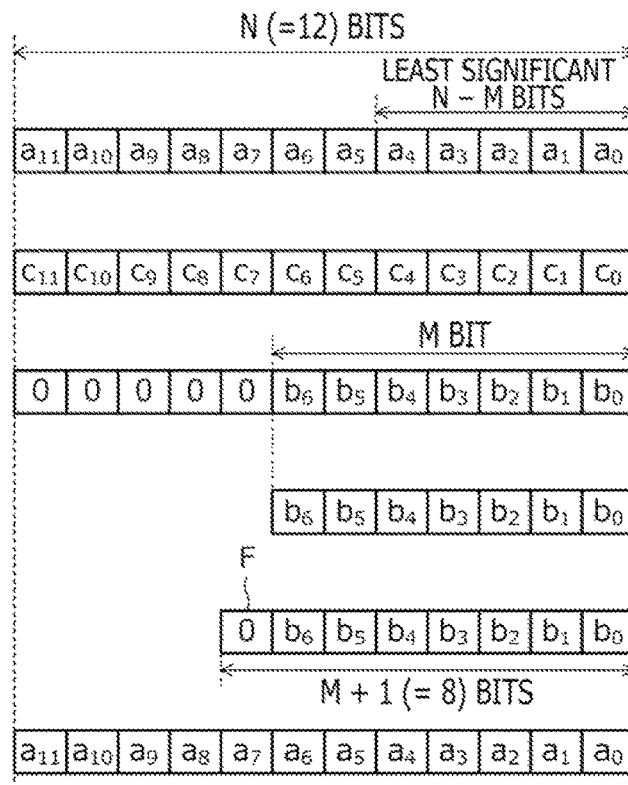
FIG. 7 is a diagram illustrating a specific example of the respective values used in the process of the processing illustrated in FIG. 4.

FIG. 6 and FIG. 7 are diagrams illustrating specific examples of the respective values used in the process of the processing illustrated in FIG. 4. FIG. 6 illustrates a case in which the standard digital value MS is set as the transmission digital value MD (i.e., a case in which step S6 in FIG. 4 is carried out). FIG. 7 illustrates a case in which the relative digital value MR is set as the transmission digital value MD (i.e., a case in which step S9 in FIG. 4 is carried out). Furthermore, FIG. 6 and FIG. 7 illustrate cases in which the compression method illustrated in FIG. 5A is used as the method for acquiring the standard digital value MS from the internal digital value NA.

Referring first to FIG. 6, as the transmission digital value MD in this case, the standard digital value MS is set which comprises the M most significant bits of the internal digital value NA. Furthermore, the transmission data MF is composed of the standard digital value MS and the identification flag F having the value indicating the standard digital value MS (the first value, for example, "1"). The already-supplied internal digital value NS after the transmission data MF is transmitted (i.e., what is set in the already-supplied internal digital value holding circuit 103 in step S11) is the internal digital value NA restored from the standard digital value MS, i.e., the value obtained by adding N-M "0" bits to the least significant side of the standard digital value MS.

Referring next to FIG. 7, as the transmission digital value MD in this case, the M-bit relative digital value MR calculated from the internal digital value NA and the already-supplied internal digital value NS is set. Furthermore, the transmission data MF is composed of the relative digital value MR and the identification flag F having the value indicating the relative digital value MR (the second value different from the first value, for example, "0"). The already-supplied internal digital value NS after the transmission data MF is transmitted (i.e., what is set in the already-supplied internal digital value holding circuit 103 in step S11) is the internal digital value NA restored from the relative digital value MR by using the already-supplied internal digital value NS, i.e., the internal digital value NA itself acquired in step S1.

Figure 8:
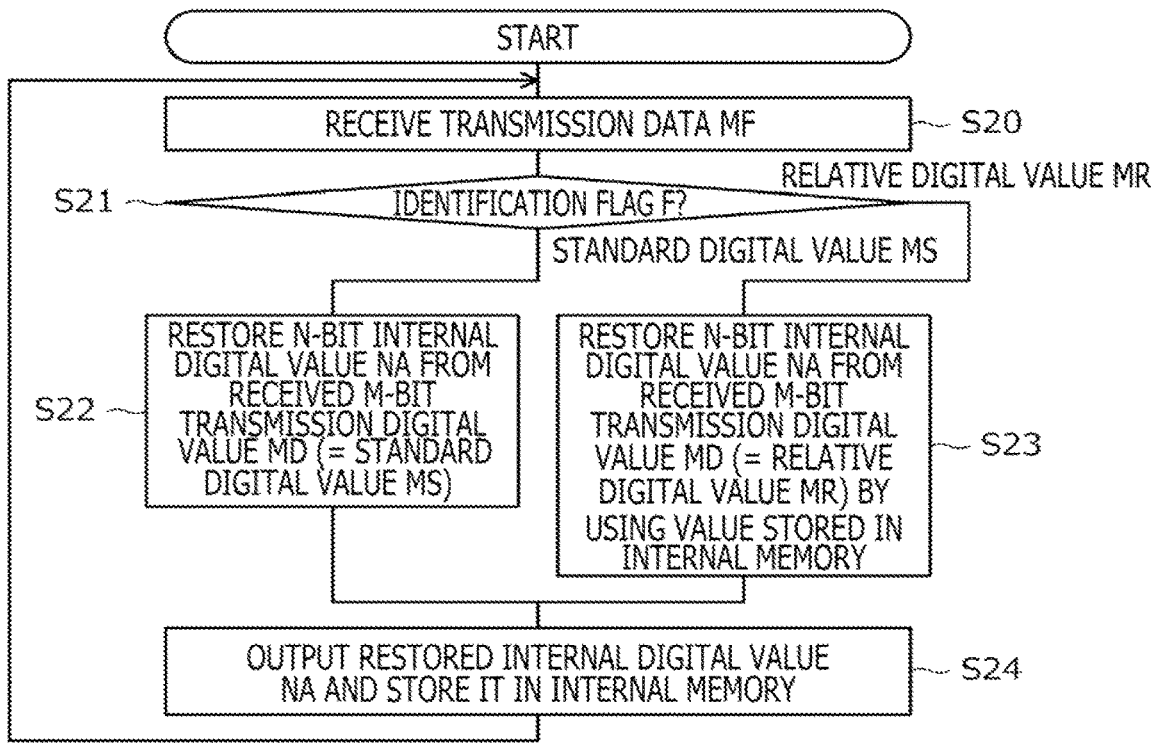
FIG. 8 is a flowchart illustrating a reception processing of the internal digital value NA executed by a sensor controller.

FIG. 8 is a flowchart illustrating a reception processing of the internal digital value NA executed by the sensor controller 31. With reference to this diagram, the reception processing of the internal digital value NA executed by the sensor controller 31 will be described in detail below.

First, the sensor controller 31 receives the transmission data MF through the sensor 30, for example (step S20). Then, based on the identification flag F included therein, the sensor controller 31 determines whether the transmission digital value MD in the transmission data MF is the standard digital value MS or the relative digital value MR (step S21).

When determining that the transmission digital value MD is the standard digital value MS in step S21, the sensor controller 31 executes processing of restoring the N-bit internal digital value NA from the received M-bit transmission digital value MD (=the standard digital value MS) (step S22). The specific content of this processing is as described with reference to FIGS. 5A and 5B.

On the other hand, the sensor controller 31 that has determined that the transmission digital value MD is the relative digital value MR in step S21 executes processing of restoring the N-bit internal digital value NA from the received M-bit transmission digital value MD (=the relative digital value MR) by using the value stored in the internal memory previously in step S24 to be described later (step S23). This processing is executed as inverse processing of the method used by the pen 2 to acquire the relative value in step S4 in FIG. 4 (for example, the processing of adding the relative digital value MR to the value stored in the internal memory).

The sensor controller 31 that has carried out step S22 or step S23 subsequently outputs the restored N-bit internal digital value NA to the host computer 4 (see FIG. 1) and stores it in the internal memory (step S24). Thereafter, the sensor controller 31 returns the processing to step S20 and waits for reception of the next transmission data MF. The internal digital value NA stored in the internal memory in step S24 is used when step S23 is carried out next.

As described above, according to the present embodiment, the N-bit internal digital value NA can be supplied with the transmission data MF smaller than N bits (specifically, with M+1 bits). Thus, it becomes possible to alleviate insufficiency of communication resources that can be used for communication between the pen 2 and the sensor device 3.

Furthermore, according to the present embodiment, the number of bits of the standard digital value MS is also set to M, and therefore it becomes possible to carry out transmission of the transmission data MF by using a fixed-length communication method. In this case, immediately after the standard digital value MS is received, an error is possibly included in the internal digital value NA restored in the sensor device 3. However, this error is eliminated by the relative digital value MR which is subsequently transmitted.

Moreover, according to the present embodiment, through acquisition of the standard digital value MS by use of the compression method illustrated in FIG. 5B, it becomes possible to reduce the possibility that the user feels or recognizes an error at the time of transmission of the standard digital value MS.

In addition, according to the present embodiment, the standard digital value MS is transmitted instead of the relative digital value MR in a certain case. Therefore, even when an error occurs between the internal digital value NA acquired by the pen 2 and the internal digital value NA acquired by the sensor device 3 due to a communication error or the like, the error can be eliminated after transmission and reception of the standard digital value MS. This effect will be described in detail below with reference to FIGS. 9A and 9B.

Figure 9A:
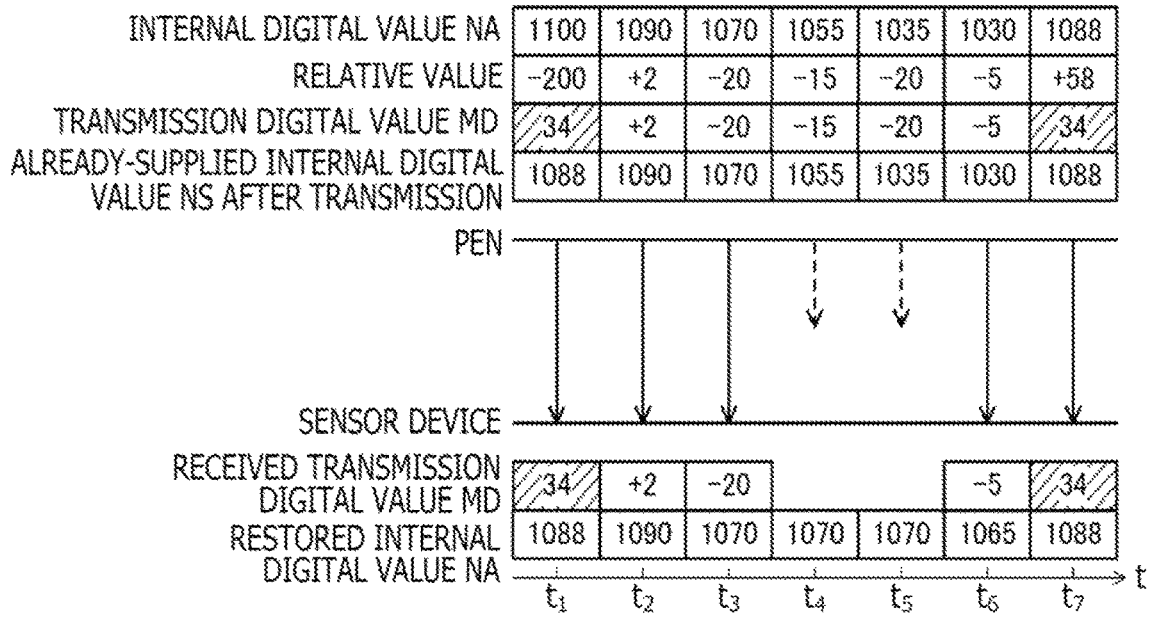
FIGS. 9A and 9B are each a diagram illustrating a temporal change in various digital values acquired in each of a pen and a sensor device.

FIG. 9A is a diagram illustrating a temporal change in various digital values acquired in each of the pen 2 and the sensor device 3. In this diagram, N=12 and M=7. In the example of this diagram, the standard digital value MS (a value with hatching) is set as the transmission digital value MD at clock times $t_1$ and $t_7$ and the relative digital value MR (a value without hatching) is set as the transmission digital value MD at clock times $t_2$ to $t_6$.

The clock time $t_1$ is the clock time when supply of the internal digital value NA from the pen 2 to the sensor device 3 has started. At the stage before the clock time $t_1$, the internal digital value NA written last in the last communication between the pen 2 and the sensor device 3 is held in the already-supplied internal digital value holding circuit 103. The relative value between the internal digital value NA thus held and the internal digital value NA newly acquired is normally a large value like "−200" exemplified in FIG. 9A, for example, and therefore the standard digital value MS is transmitted also at the clock time $t_1$. However, after the communication between the pen 2 and the sensor device 3 ends, the integrated circuit 27 may overwrite the held content of the already-supplied internal digital value holding circuit 103 with a predetermined value. Although the specific value of this predetermined value is not particularly limited, it is preferable to use a value far from values that can be normally taken by the internal digital value NA (for example, the maximum value "4095 (=111111111111)"). This can prevent the relative digital value MR from being transmitted first in the next communication. Furthermore, the reason why the standard digital value MS is transmitted at the clock time $t_7$ is that the internal digital value NA "1088

(=010001000000)" corresponds with the value "1088 (=010001000000)" obtained by adding N−M "0" bits to the tail end of the standard digital value MS "34 (=0100010)" obtained from this internal digital value NA and, hence, the determination result of step S3 in FIG. 4 is positive ("YES").

In FIG. 9A, a communication error occurs at the clock times $t_4$ and is and the transmission data MF does not reach the sensor device 3. As a result, at the clock times $t_4$ to $t_6$, the internal digital value NA acquired by the pen 2 does not correspond with the internal digital value NA restored in the sensor device 3. However, due to the transmission of the standard digital value MS by the pen 2 at the clock time $t_7$, they return to the corresponding state again. As above, according to the present embodiment, the error that occurs due to a communication error can be eliminated by the standard digital value MS, which is transmitted when the internal digital value NA can be restored from the standard digital value MS without an error.

Figure 9B:
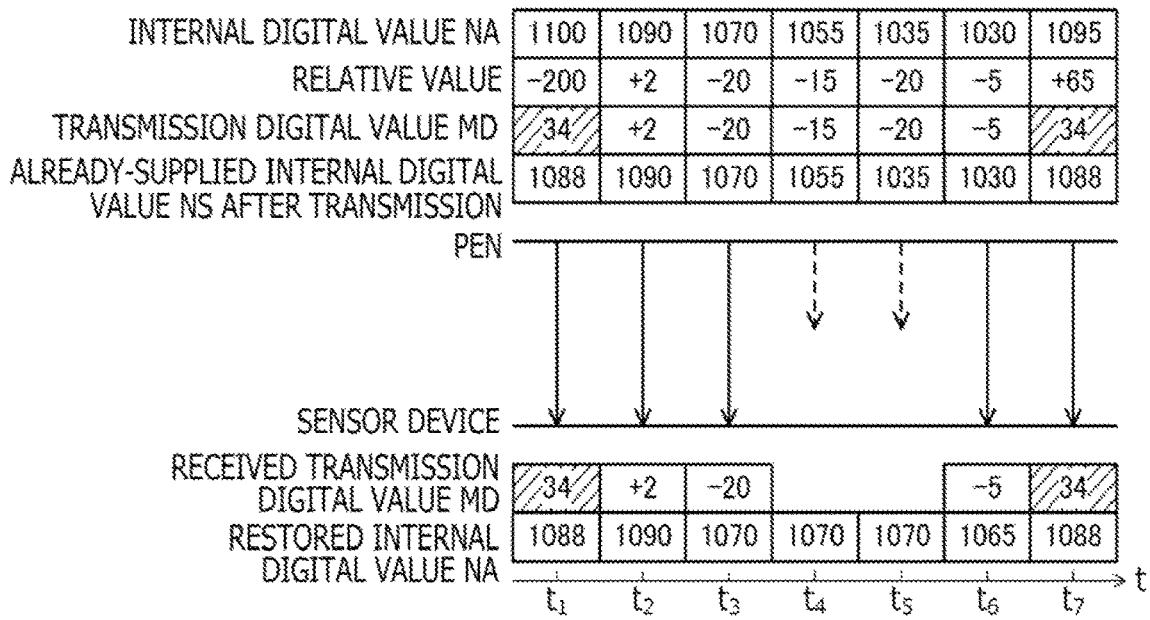
Figure 10:
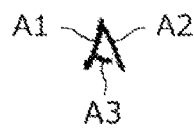
FIG. 10 is a diagram illustrating a working example of the first embodiment of the present disclosure.

Next, FIG. 9B is also a diagram illustrating a temporal change in various digital values acquired in each of the pen 2 and the sensor device 3. Also in this diagram, N=12 and M=7. The situation up to the clock time $t_6$ in the example of this diagram is the same as in FIG. 9A. At the clock times $t_4$ to $t_6$, the internal digital value NA acquired by the pen 2 does not correspond with the internal digital value NA restored in the sensor device 3. Thereafter, the internal digital value NA changes significantly at the clock time $t_7$. As a result, the relative value exceeds the range in which the relative value can be expressed with M bits (with M=7, −64 to +63) and thus the pen 2 transmits the standard digital value MS at the clock time $t_7$. As a result, similarly to the case of FIG. 9A, the internal digital value NA acquired by the pen 2 corresponds with the internal digital value NA restored in the sensor device 3 again at the clock time $t_7$. As above, according to the present embodiment, the error that occurs due to a communication error can be eliminated also by the standard digital value MS, which is transmitted when the relative value cannot be expressed with M−1 bits. When the standard digital value MS is thus transmitted, there is a possibility that the internal digital value NA acquired by the pen 2 does not correspond with the internal digital value NA restored in the sensor device 3 and thus an error remains. However, as described above, this error is eliminated by the immediately-subsequent relative digital value MR. In addition, the impact of this error on the perception of a human user is limited and therefore this error does not become a significant program.

Figure 11:
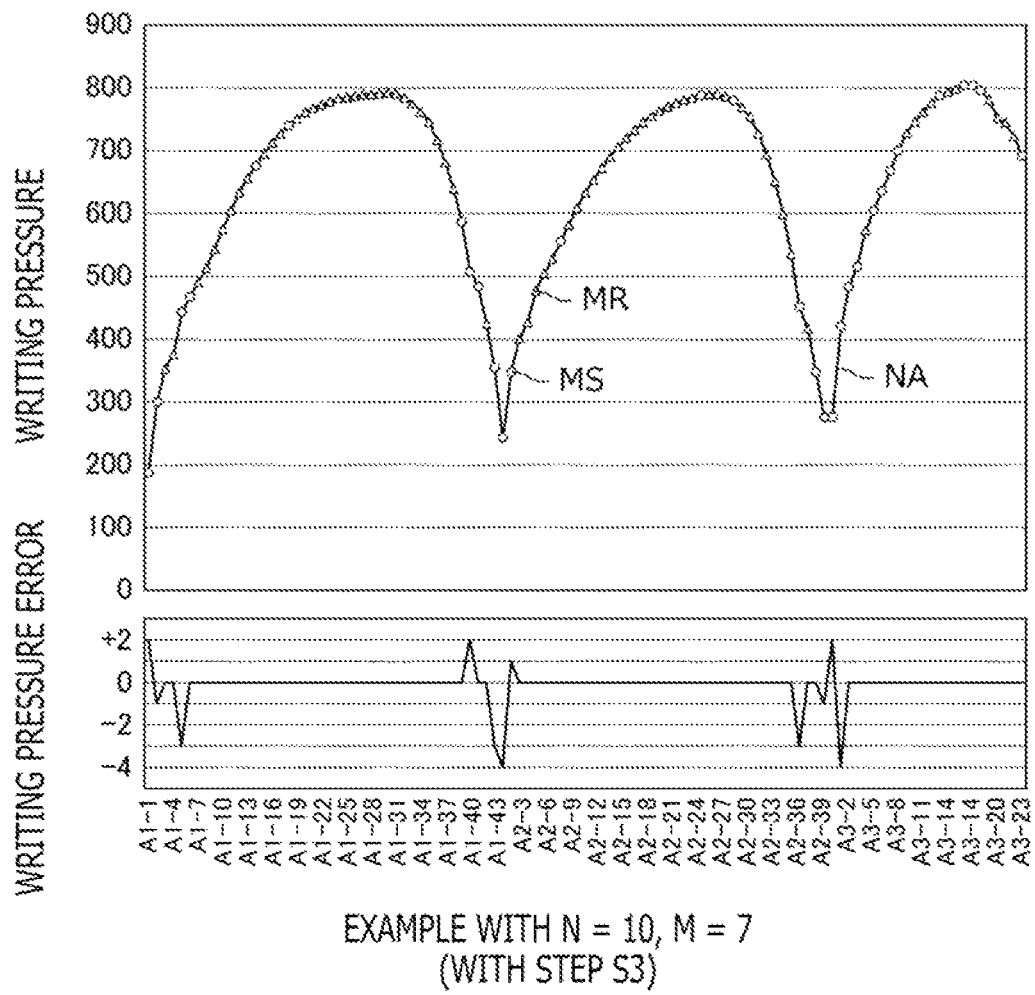
FIG. 11 is a diagram illustrating a working example of the first embodiment of the present disclosure.
Figure 12:
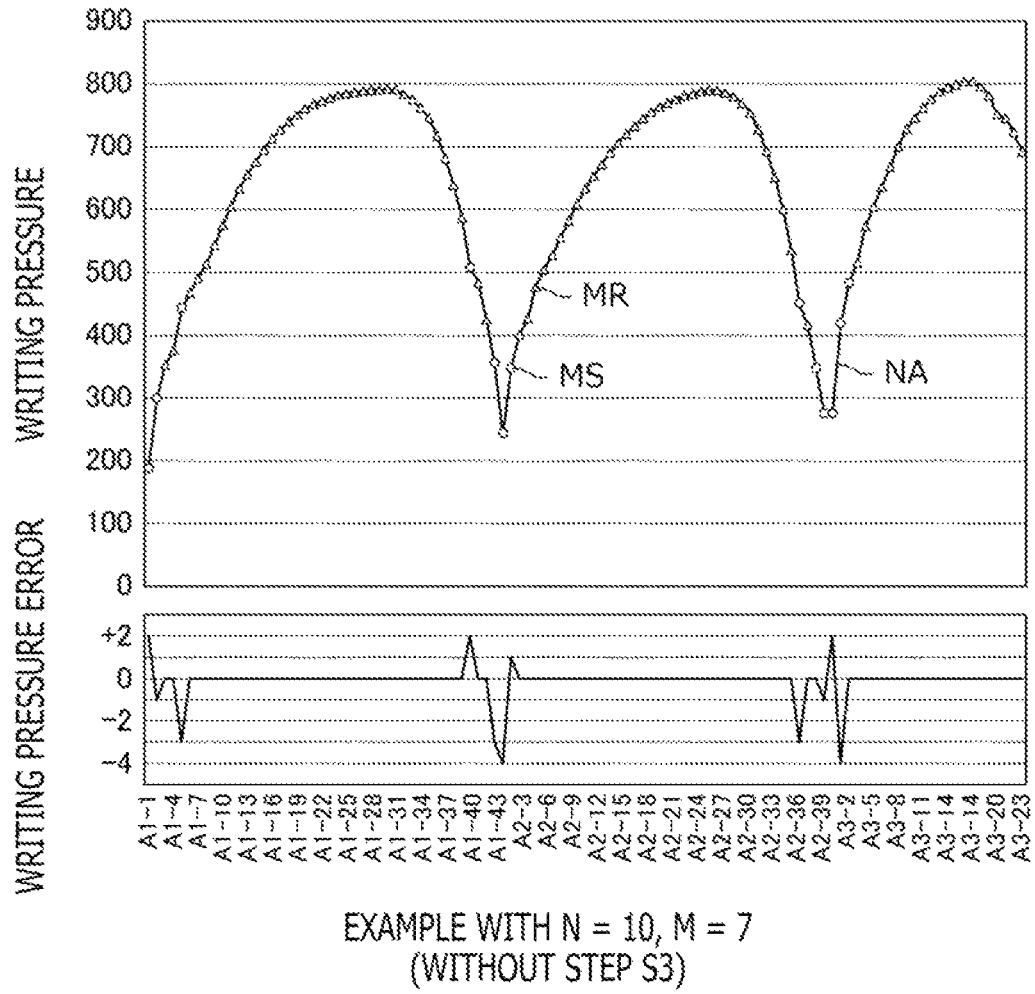
FIG. 12 is a diagram illustrating the working example of the first embodiment of the present disclosure.
Figure 13:
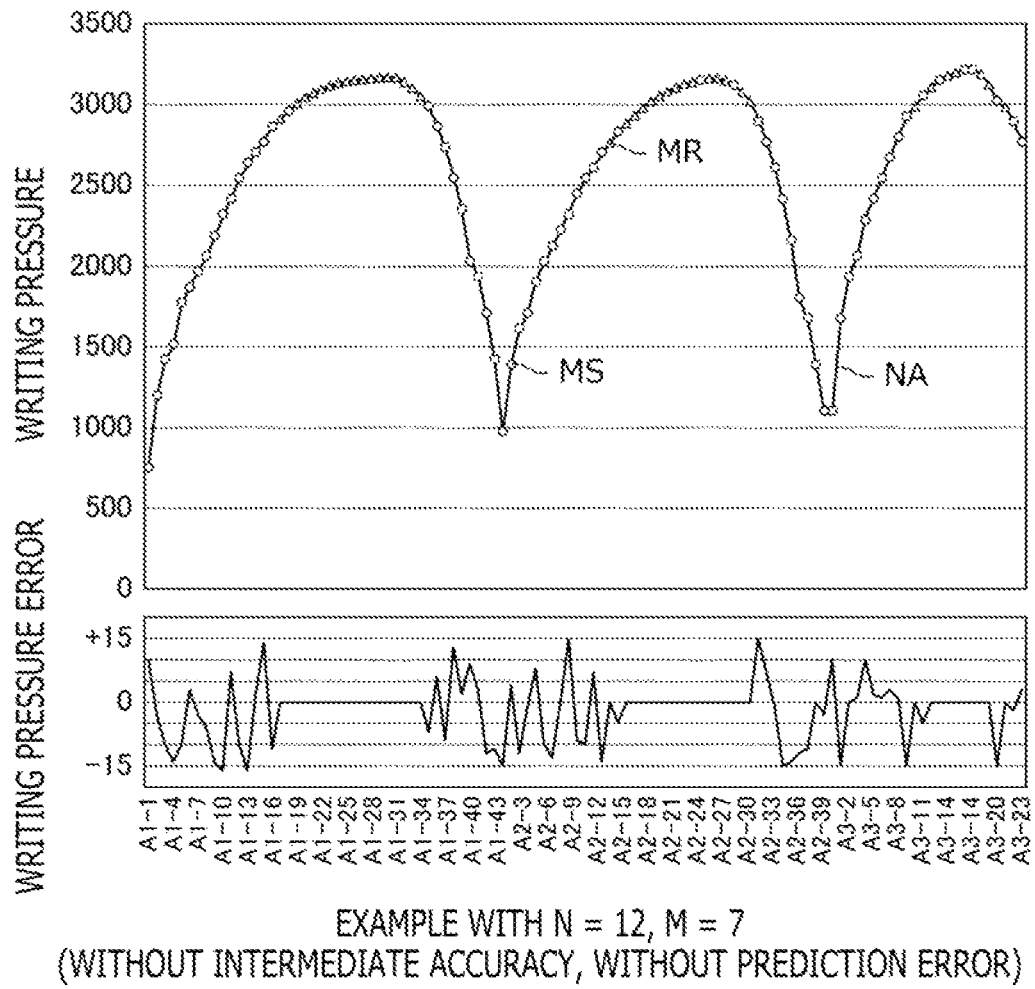
FIG. 13 is a diagram illustrating the working example of the first embodiment of the present disclosure.

FIG. 10 to FIG. 13 are diagrams illustrating a working example of the present embodiment. Curves illustrated in the upper portions of FIG. 11 to FIG. 13 represent the internal digital value NA (e.g., a writing pressure value) sequentially acquired by the integrated circuit 27 (see FIG. 3) when a user inputs three strokes A1 to A3 illustrated in FIG. 10 by using the pen 2. In FIGS. 11-13, white circle marks represent that the standard digital value MS is set as the transmission digital value MD at the timing and the specific value of the set standard digital value MS. White triangle marks represent that the relative digital value MR is set as the transmission digital value MD at the timing and the specific value of the set relative digital value MR. Moreover, curves illustrated in the lower portions of FIG. 11 to FIG. 13 represent the error between the original internal digital value NA and the internal digital value NA restored from the transmission digital value MD. Examples where N=10 and M=7 are illustrated in FIG. 11 and FIG. 12, and an example where N=12 and M=7 is illustrated in FIG. 13. Furthermore, FIG. 12 illustrates an example in which the determination result of step S3 illustrated in FIG. 4 is fixed as the negative result (i.e., a case in which, even when the internal digital value NA can be restored from the standard digital value MS without an error, transmission of the standard digital value MS for that reason is not carried out).

Referring first to FIG. 11, it is understood that the standard digital value MS is set as the transmission digital value MD at portions in which the internal digital value NA changes significantly, at the start and end of each stroke, whereas the relative digital value MR is set as the transmission digital value MD at portions in which a change in the internal digital value NA is small, mostly in the middle of each stroke. Furthermore, it is understood that, in the middle of each stroke, the state in which the error between the original internal digital value NA and the internal digital value NA restored from the transmission digital value MD is 0 continues including the case in which the standard digital value MS is set as the transmission digital value MD. The case in which the standard digital value MS is set as the transmission digital value MD and the error between the original internal digital value NA and the internal digital value NA restored from the transmission digital value MD becomes 0 is, in short, the case in which the standard digital value MS is set as the transmission digital value MD because the determination result of step S3 in FIG. 4 is positive. Moreover, it is understood that the absolute value of the error between the original internal digital value NA and the internal digital value NA restored from the transmission digital value MD is up to 4.

From the example of FIG. 11, it can be said that, according to the present embodiment, the internal digital value NA can be transmitted from the pen 2 to the sensor device 3 in the state in which the error is sufficiently small at least in the case of N=10 and M=7. Therefore, it becomes possible to apply the present embodiment to the pen system 1 and reduce communication resources used for transmission of the internal digital value NA. Thus, according to the present embodiment, insufficiency of communication resources that can be used for communication between the pen 2 and the sensor device 3 can be alleviated.

Referring next to FIG. 12, it is understood that a result similar to that when step S3 is carried out is obtained even when step S3 is skipped. Therefore, in this case, it is not necessarily essential to determine whether or not the internal digital value NA can be restored from the standard digital value MS without an error and to change the processing according to the determination result.

Lastly, referring to FIG. 13, in the example of this diagram, the case in which the standard digital value MS is set as the transmission digital value MD is more frequent compared with FIG. 11, and the absolute value of the error between the original internal digital value NA and the internal digital value NA restored from the transmission digital value MD is a large value (at most 15) in a wide range. In this case, it is difficult to apply the present embodiment to the pen system 1, and insufficiency of communication resource that can be used for communication between the pen 2 and the sensor device 3 may not be alleviated by the present embodiment in the case of N=12 and M=7. A further technique may be needed to achieve the desired effect also in the case of N=12 and M=7. In the second and third embodiments to be described below, some examples of such technique will be described.

Figure 14:
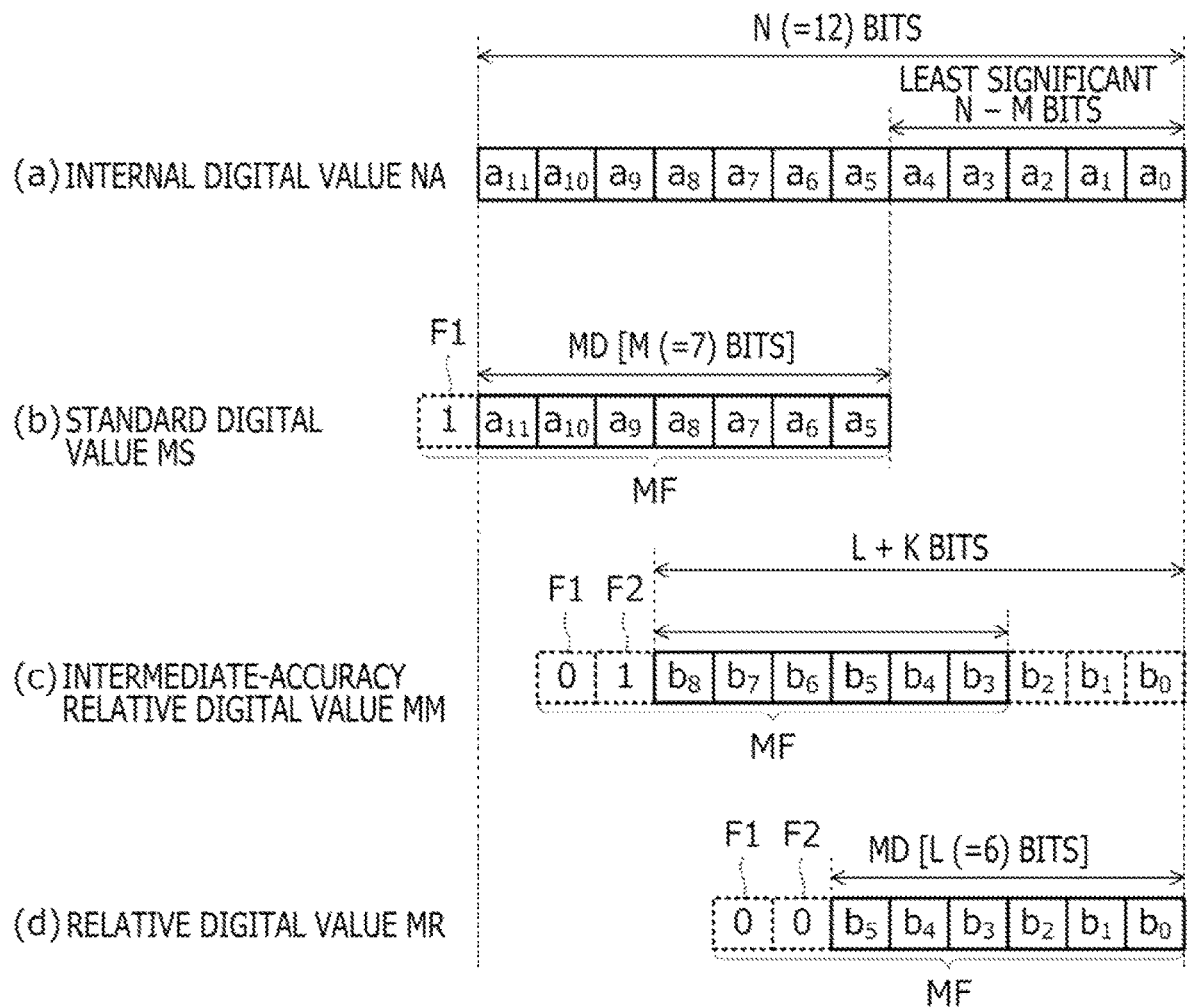
FIG. 14 is a diagram explaining the principle of a second embodiment of the present disclosure.

FIG. 14 is a diagram explaining the principle of the second embodiment of the present disclosure. The present embodiment is different from the first embodiment in that a medium-accuracy relative digital value MM is used in addition to the relative digital value MR used also in the first embodiment, and is the same as the first embodiment in other respects. In the following, the description will be continued with focus on the difference from the first embodiment.

The integrated circuit 27 according to the present embodiment is configured to, in transmitting the N-bit internal digital value NA, transmit the transmission data MF with bits smaller than N bits including the transmission digital value MD that is any of the M-bit standard digital value MS, the L-bit (L<M) medium-accuracy relative digital value MM, or the L-bit relative digital value MR, which are illustrated in the diagram, instead of the internal digital value NA itself. An example with L=M−1 is illustrated in FIG. 14 and the description will be continued using this example in the following. However, it suffices for L to be an integer smaller than M, and L=M−1 does not need to be satisfied.

One identification flag F1 is included in the transmission data MF if the transmission digital value MD is the standard digital value MS. On the other hand, two identification flags F1 and F2 are included in the transmission data if the transmission digital value MD is the medium-accuracy relative digital value MM or the relative digital value MR. The identification flag F1 is one-bit data that becomes a first value (for example, "1") if the transmission digital value is the standard digital value MS, and becomes a second value (for example, "0") different from the first value if the transmission digital value is not the standard digital value MS. The identification flag F2 is one-bit data that becomes a third value (for example, "1") if the transmission digital value is the medium-accuracy relative digital value MM, and becomes a fourth value (for example, "0") different from the third value if the transmission digital value is the relative digital value MR.

The relative digital value MR according to the present embodiment is composed of the relative value expressed with L bits, when the relative value described in the first embodiment is what can be expressed with L bits. The medium-accuracy relative digital value MM is composed of the L most significant bits of the relative value expressed with L+K bits, when the relative value described in the first embodiment is what can be expressed with L+K bits (1≤K≤N−M). The medium-accuracy relative digital value MM may be obtained by compressing the internal digital value NA by the same compression method as the compression method illustrated in FIG. 5B.

Figure 15:
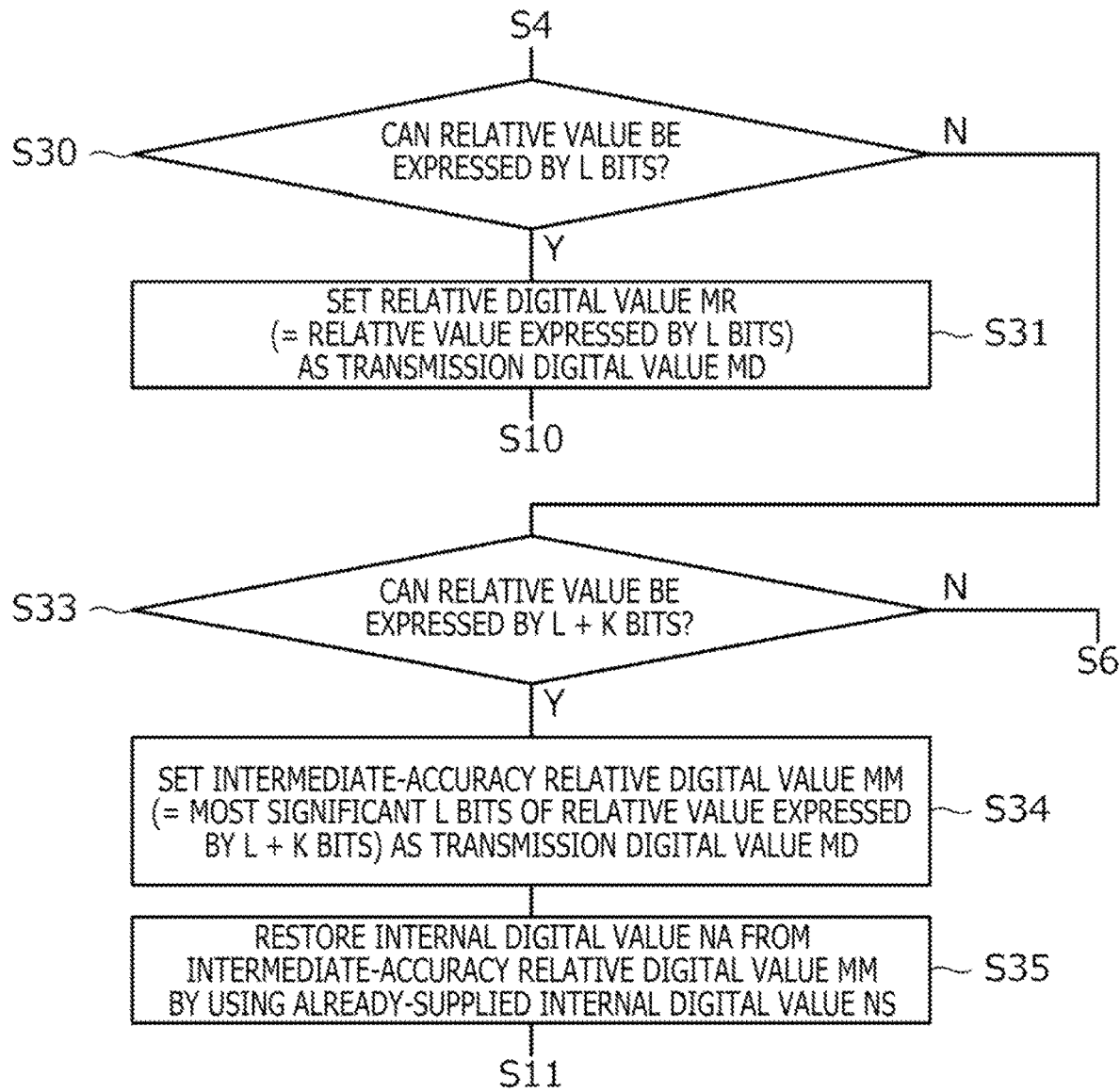
FIG. 15 is a flowchart illustrating a transmission processing of the internal digital value NA executed by the integrated circuit according to the second embodiment of the present disclosure.

FIG. 15 is a flowchart illustrating a transmission processing of the internal digital value NA executed by the integrated circuit 27 according to the present embodiment. With reference to FIG. 15, the transmission processing of the internal digital value NA executed by the integrated circuit 27 according to the present embodiment will be described in detail below. The processing flow of FIG. 15 replaces a portion of FIG. 4.

After acquiring the relative value between the already-supplied internal digital value NS and the internal digital value NA by carrying out step S4 of FIG. 4, the integrated circuit 27 according to the present embodiment determines whether or not the acquired relative value can be expressed with L bits (step S30). When determining that the relative value cannot be so expressed, the integrated circuit 27 moves the processing to step S33. When determining that the relative value can be expressed, the integrated circuit 27 moves the processing to step S31.

In step S31, the integrated circuit 27 sets the relative digital value MR, which is the relative value expressed with L bits, as the transmission digital value MD (step S31) and moves the processing to step S10 of FIG. 4.

On the other hand, in step S33, the integrated circuit 27 determines whether or not the relative value acquired in step S4 can be expressed with L+K bits (step S33). When determining that the relative value cannot be so expressed, the integrated circuit 27 moves the processing to step S6 of FIG. 4. When determining that the relative value can be expressed, the integrated circuit 27 moves the processing to step S34.

In step S34, the integrated circuit 27 sets the medium-accuracy relative digital value MM, which is the L most significant bits of the relative value expressed with L+K bits, as the transmission digital value MD (step S34). Then, the integrated circuit 27 restores the internal digital value NA from the medium-accuracy relative digital value MM by using the already-supplied internal digital value NS (step S35) and thereafter moves the processing to step S11 of FIG. 4. The restoration processing is carried out by the same method as the restoration carried out by the sensor device 3 in steps S8 and S10 illustrated in FIG. 4.

Figure 16:
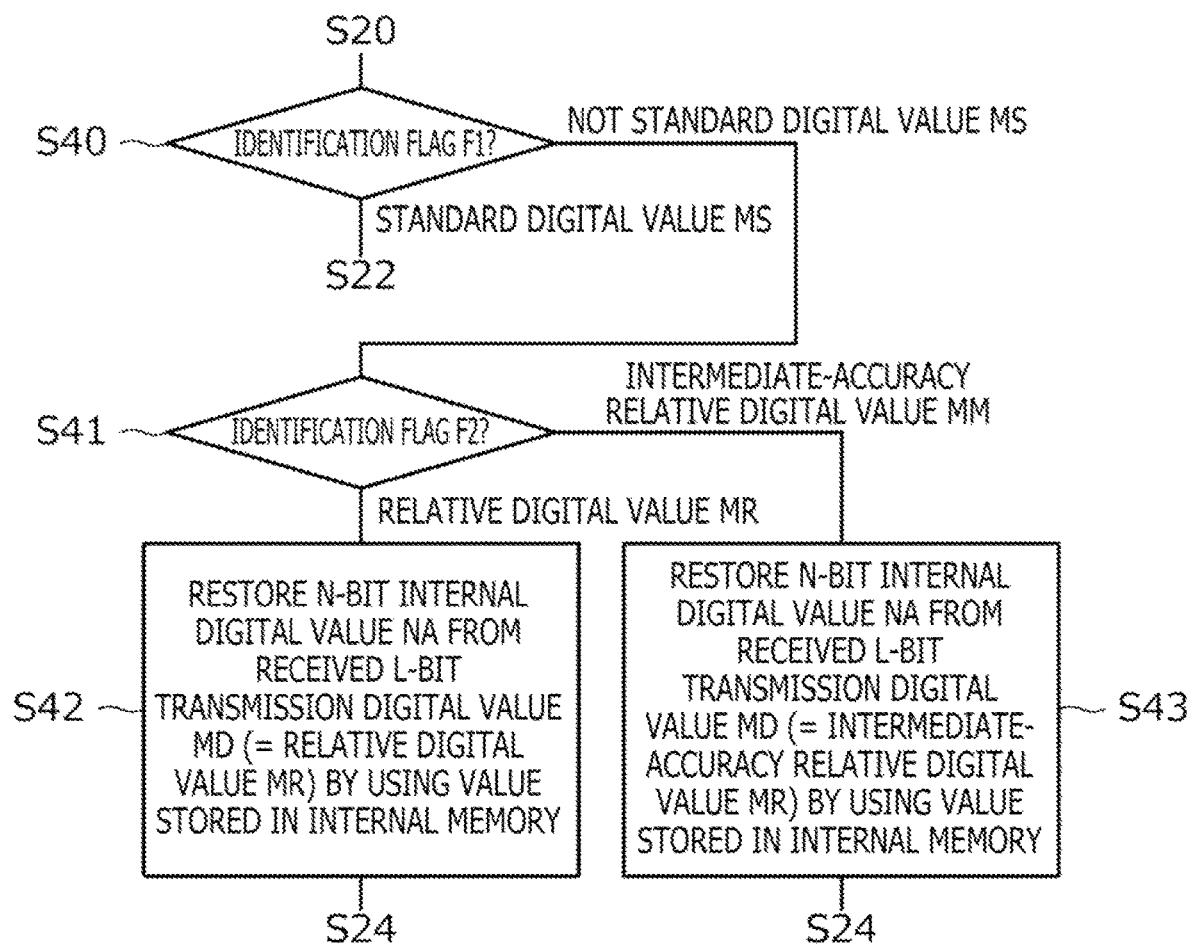
FIG. 16 is a flowchart illustrating a reception processing of the internal digital value NA executed by the sensor controller according to the second embodiment of the present disclosure.

FIG. 16 is a flowchart illustrating a reception processing of the internal digital value NA executed by the sensor controller 31 according to the present embodiment. With reference to this diagram, the reception processing of the internal digital value NA executed by the sensor controller 31 according to the present embodiment will be described in detail below. The processing flow of FIG. 16 replaces a portion of FIG. 8.

After receiving the transmission data MF by carrying out step S20 of FIG. 8, the sensor controller 31 according to the present embodiment determines whether or not the transmission digital value MD in the transmission data MF is the standard digital value MS based on the identification flag F1 included in the transmission data MF (step S40).

When determining that the transmission digital value MD is the standard digital value MS in step S40, the sensor controller 31 moves the processing to step S22 in FIG. 8 (i.e., the step of restoring the internal digital value NA from the standard digital value MS). On the other hand, when determining that the transmission digital value MD is not the standard digital value MS in step S40, the sensor controller 31 further determines whether the transmission digital value MD in the transmission data MF is the relative digital value MR or the medium-accuracy relative digital value MM based on the identification flag F2 included in the received transmission data MF (step S41).

The sensor controller 31, when determining that the transmission digital value MD is the relative digital value MR in step S41, executes processing of restoring the N-bit internal digital value NA from the received L-bit transmission digital value MD (=the relative digital value MR) by using the value previously stored in the internal memory in step S24 of FIG. 8 (step S42). This processing is executed as inverse processing of the method used by the pen 2 to acquire the relative value in step S4 of FIG. 4.

On the other hand, the sensor controller 31, which has determined that the transmission digital value MD is the medium-accuracy relative digital value MM in step S41, executes processing of restoring the N-bit internal digital value NA from the received L-bit transmission digital value MD (=the medium-accuracy relative digital value MM) by using the value previously stored in the internal memory in step S24 of FIG. 8 (step S43). This processing is executed by first adding K "0" bits to the least significant side of the transmission digital value MD to acquire a digital value of L+K bits and executing, on this digital value, inverse processing of the method used by the pen 2 to acquire the relative value in step S4 of FIG. 4.

The sensor controller 31 that has carried out step S42 or step S43 moves the processing to step S24 of FIG. 8 (the step of outputting the restored N-bit internal digital value NA and storing it in the internal memory).

Figure 17:
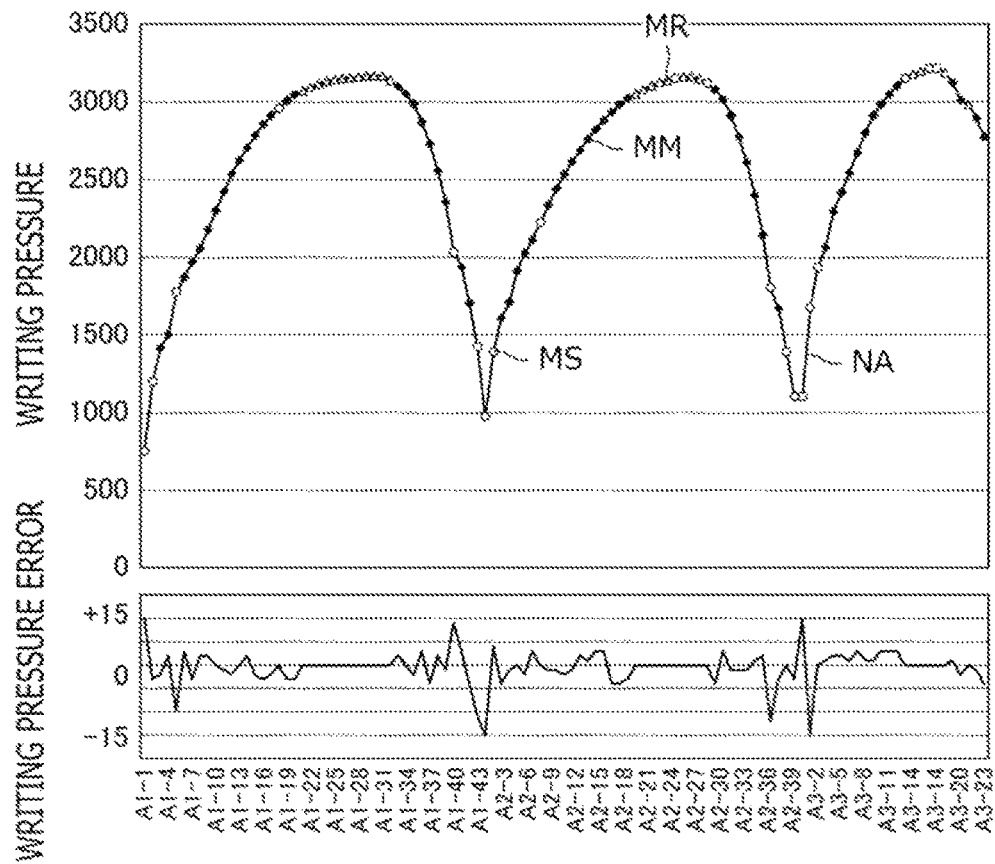
FIG. 17 is a diagram illustrating a working example of the second embodiment of the present disclosure.

FIG. 17 is a diagram illustrating a working example of the present embodiment. The meanings of the curve, white circle marks, and white triangle marks in the upper portion of this diagram and the curve in the lower portion of this diagram are the same as those in FIG. 11 to FIG. 13. Black square marks illustrated in the upper portion of FIG. 17 represent that the medium-accuracy relative digital value MM is set as the transmission digital value MD at the timing and the specific value of the set medium-accuracy relative digital value MM. In FIG. 17, an example where N=12 and M=8 is illustrated as with FIG. 13. L=M−1=7 is satisfied.

As is understood from FIG. 17, in the present working example, the medium-accuracy relative digital value MM is set as the transmission digital value MD at places at which a change in the internal digital value NA is at a medium degree. As a result, the range in which the error (discrepancy) between the original internal digital value NA and the internal digital value NA restored from the transmission digital value MD becomes large is small compared with the example of FIG. 13. As a result, in the present embodiment, there are fewer issues associated with actually using the pen system 1 as compared with the first embodiment. Therefore, according to the present embodiment, insufficiency of communication resources that can be used for communication between the pen 2 and the sensor device 3 can be alleviated also in the case where N=12 and M=8.

Although the example in which one kind of medium-accuracy relative digital value MM is used is described in the present embodiment, plural kinds of medium-accuracy relative digital value MM may be used. For example, an medium-accuracy relative digital value that comprises the L most significant bits of a relative value expressed with L+K1 bits (1≤K1≤N−M) and an medium-accuracy relative digital value that comprises the L most significant bits of a relative value expressed with L+K2 bits (1≤K2≤N−M and K2>K1) may be used. In this case, the identification flag may be one to identify whether the number of kinds of medium-accuracy relative digital value increases or decreases, for example.

Furthermore, the magnitude of the value represented by one bit of the medium-accuracy relative digital value MM (i.e., a value of K) may be changed adaptively according to the relative value or the amount of a change in the relative value. In this case, the identification flag may be what represents the change ratio of the magnitude of the value represented by one bit of the medium-accuracy relative digital value MM (i.e., a ratio between K before the change and K after the change).

In the present embodiment, the example is described in which the one-bit identification flag is added to the standard digital value MS and the two-bit identification flag is added to the relative digital value MR and the medium-accuracy relative digital value MM. However, the one-bit identification flag may be added to one of the relative digital value MR and the medium-accuracy relative digital value MM, and the two-bit identification flag may be added to the other of the relative digital value MR and the medium-accuracy relative digital value MM, and the standard digital value MS. This makes it possible to set the number of bits of one of the relative digital value MR and the medium-accuracy relative digital value MM to M bits and to set the other of the relative digital value MR and the medium-accuracy relative digital value MM, and the standard digital value MS, to L bits. In short, how many bits of the flag are assigned to which type of writing pressure expression (e.g., the standard digital value MS, the medium-accuracy relative digital value MM, or the relative digital value MR, and so forth) can be arbitrarily set.

Figure 18:
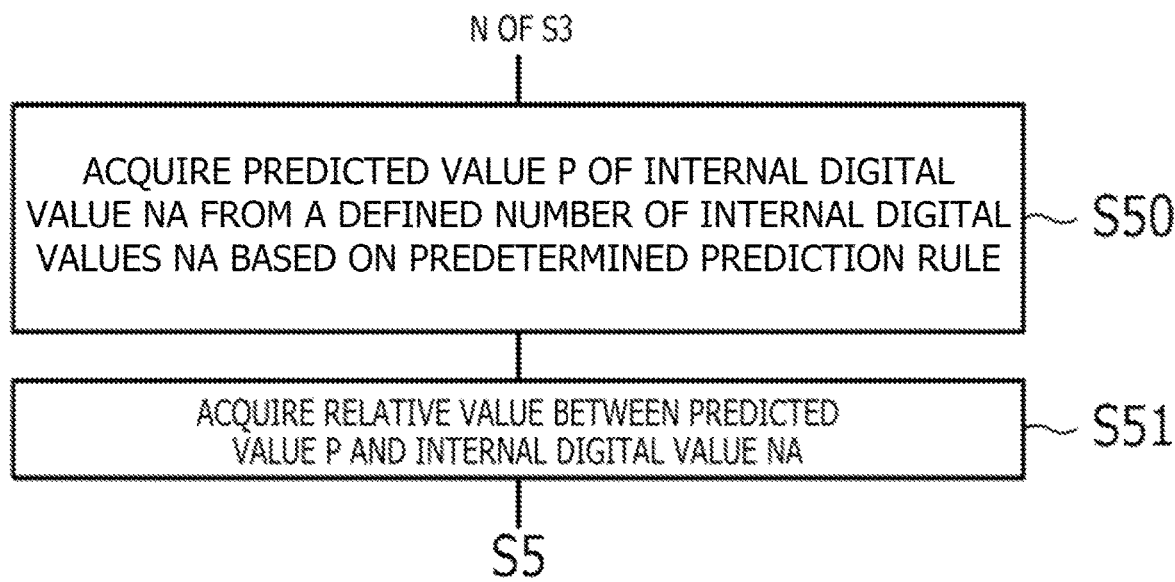
FIG. 18 is a flowchart illustrating a transmission processing of the internal digital value NA executed by the integrated circuit according to a third embodiment of the present disclosure.

FIG. 18 is a flowchart illustrating a transmission processing of the internal digital value NA executed by the integrated circuit 27 according to the third embodiment of the present disclosure. The processing flow of FIG. 18 replaces a portion of FIG. 4. The present embodiment is different from the first embodiment in that a relative value between a predicted value P of the internal digital value NA and the internal digital value NA is used, instead of the relative value between the already-supplied internal digital value NS and the internal digital value NA, and is the same as the first embodiment in other respects. In the following, the description will be continued with focus on the difference from the first embodiment.

The already-supplied internal digital value holding circuit 103 of the integrated circuit 27 according to the present embodiment is configured to store a defined number of the internal digital values NA(s) (as set in step S11). Furthermore, as illustrated in FIG. 18, after the negative determination in step S3, the integrated circuit 27 according to the present embodiment executes processing of acquiring the predicted value P of the internal digital value NA from the stored defined number of the internal digital values NA(s) based on a predetermined prediction rule (step S50). This processing can be executed based on an interpolation curve of the defined number of the internal digital values NA(s), for example. As one example, an example based on an interpolation curve of two (the defined number=2) of the internal digital values NA(s) will be described in detail. First, the interpolation curve of the two previous internal digital values NA(s) is obtained. The interpolation curve in this case is a straight line, and NA(n)=−10n+1080 is obtained as the interpolation curve if the two previous internal digital values NA(s) are "1100" and "1090," for example. For example, NA(n) may represent the n-th internal digital value NA in a series, and n is a numerical value that becomes −2 for the internal digital value NA before last (two times before), −1 for the internal digital value NA of the last time (one time before), and 0 for the internal digital value NA of the present time. By substituting n=0 in the interpolation curve thus obtained, the predicted value P can be obtained as "1080."

The integrated circuit 27, which has carried out step S50, executes processing of acquiring the relative value between the predicted value P and the internal digital value NA acquired in step S1 instead of step S4 of FIG. 4 (step S51). The relative value acquired here is the difference between the predicted value P and the internal digital value NA acquired in step S1, for example. Thereafter, the integrated circuit 27 moves the processing to step S5 and executes the processing described with reference to FIG. 4.

Figure 19:
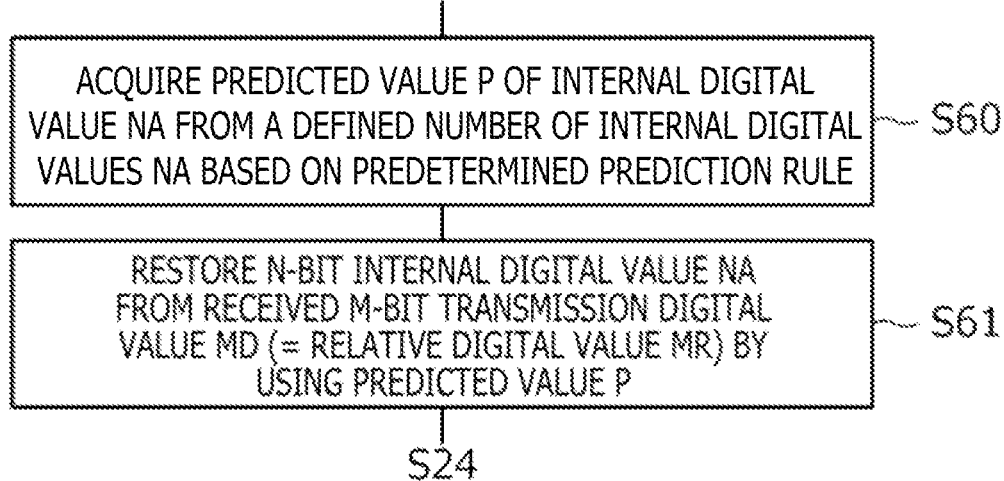
FIG. 19 is a flowchart illustrating a reception processing of the internal digital value NA executed by the sensor controller according to the third embodiment of the present disclosure.

Next, FIG. 19 is a flowchart illustrating a reception processing of the internal digital value NA executed by the sensor controller 31 according to the present embodiment. The processing flow of FIG. 19 replaces a portion of FIG. 8.

The sensor controller 31 according to the present embodiment is configured to store a defined number of the internal digital values NA(s) (as stored in step S24) in the internal memory. As illustrated in FIG. 19, when determining that the transmission digital value MD in the transmission data MF is the relative digital value MR in step S21, the sensor controller 31 according to the present embodiment executes processing of acquiring the predicted value P of the internal digital value NA from the stored determined number of the internal digital values NA(s) based on the predetermined prediction rule (step S60). This processing is executed by the same method as in step S50 of FIG. 18.

The sensor controller 31, which has carried out step S60, executes, instead of step S23 of FIG. 8, processing of restoring the N-bit internal digital value NA from the received M-bit transmission digital value MD (=the relative digital value MR) by using the predicted value P (step S61). This processing is executed as inverse processing of the method used by the pen 2 to acquire the relative value in step S51 of FIG. 8 (for example, the processing of adding the relative digital value MR to the predicted value P). Thereafter, the sensor controller 31 moves the processing to step S24 and executes the processing described with reference to FIG. 8.

Figure 20:
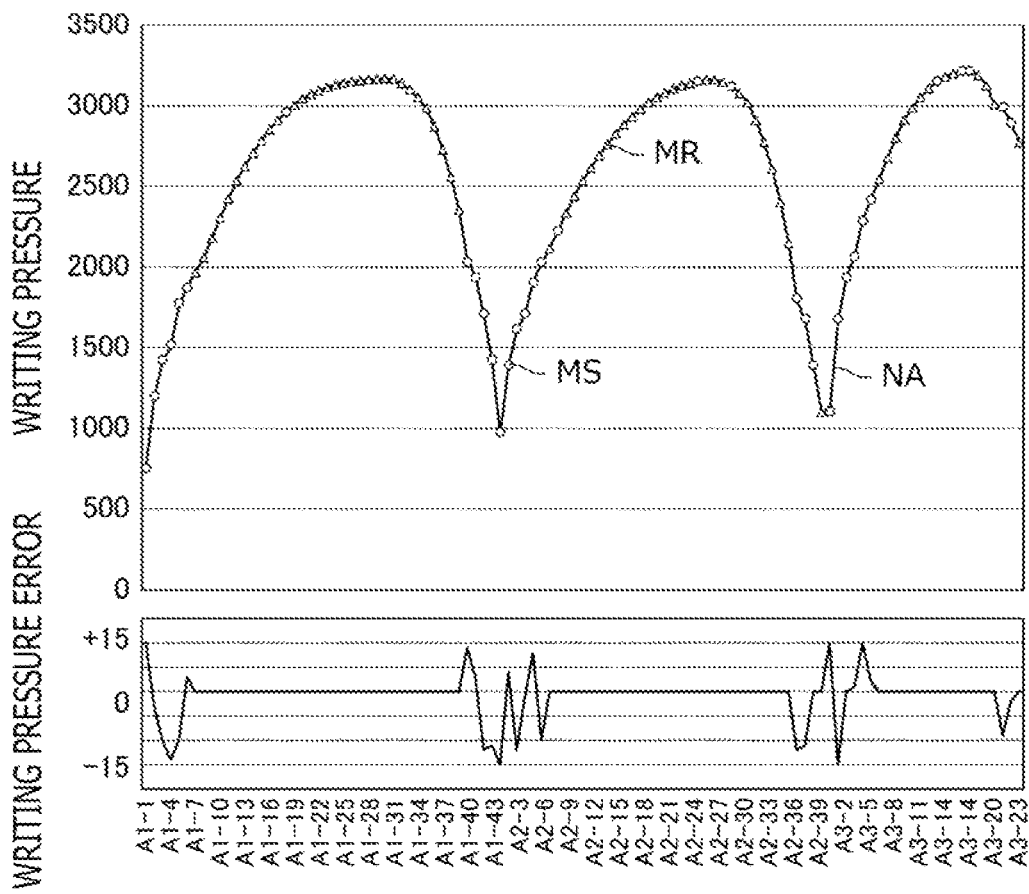
FIG. 20 is a diagram illustrating a working example of the third embodiment of the present disclosure.

FIG. 20 is a diagram illustrating a working example of the present embodiment. The meanings of the curve, white circle marks, and white triangle marks in the upper portion of this diagram and the curve in the lower portion of this diagram are the same as those in FIG. 11 to FIG. 13 and FIG. 17. In FIG. 20, an example in which N=12 and M=7 is illustrated as with FIG. 13 and FIG. 17.

As is understood from FIG. 20, in the present working example, the range in which the error (difference) between the original internal digital value NA and the internal digital value NA restored from the transmission digital value MD becomes large is small compared with the examples of FIG. 13 and FIG. 17. As a result, in the present embodiment, there are fewer issues associated with actually using the pen system 1 than in the second embodiment. Therefore, also by the present embodiment, insufficiency of communication resources that can be used for communication between the pen 2 and the sensor device 3 can be alleviated also in the case where N=12 and M=7.

Figure 21:
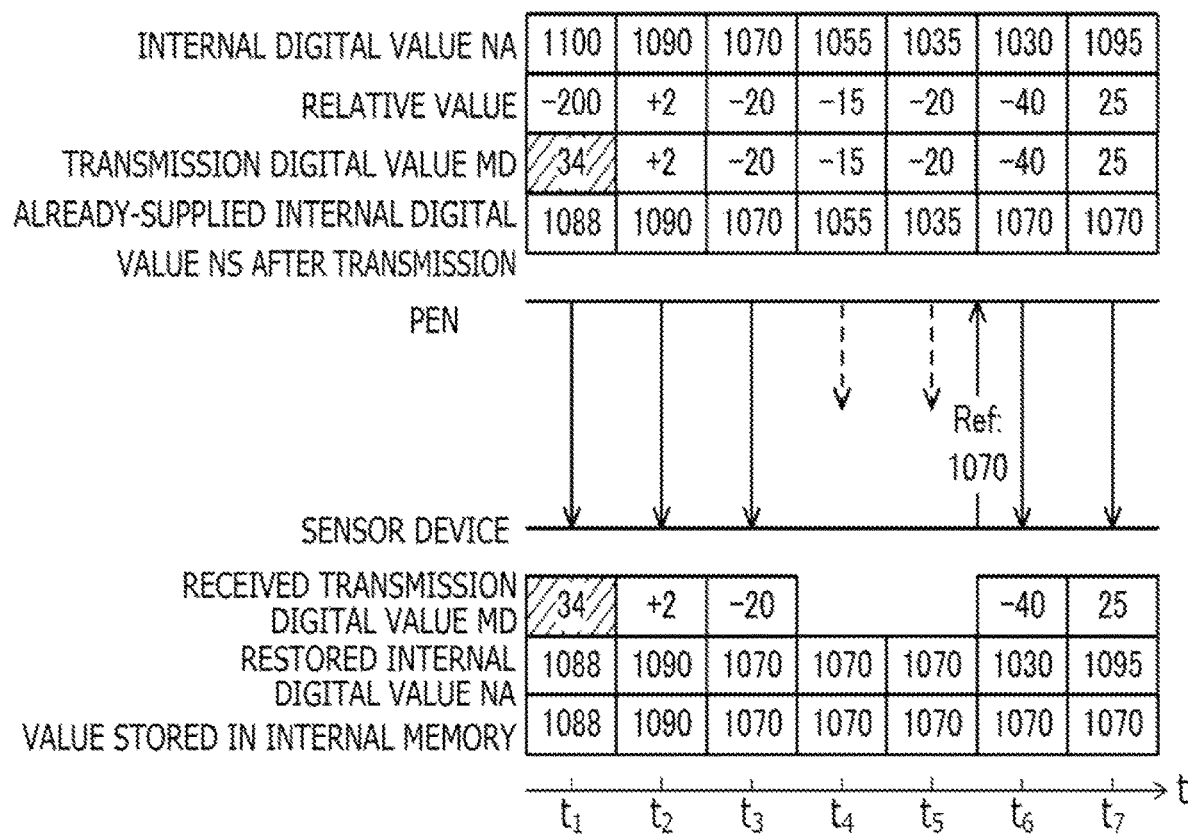
FIG. 21 is a diagram illustrating a temporal change in various digital values acquired in each of the pen and the sensor device according to a fourth embodiment of the present disclosure.

FIG. 21 is a diagram illustrating a temporal change in various digital values acquired in each of the pen 2 and the sensor device 3 according to the fourth embodiment of the present disclosure. As illustrated in this diagram, the present embodiment is different from the first embodiment in that the reference value Ref is supplied from the sensor device 3 to the pen 2, and the already-supplied internal digital value NS is updated based on this reference value Ref, and is the same as the first embodiment in other respects. In the following, the description will be continued with focus on the difference from the first embodiment.

As illustrated in FIG. 21, the sensor controller 31 according to the present embodiment is configured to employ the internal digital value NA stored in the internal memory (a value stored in step S24) as the reference value Ref, and to transmit the reference value Ref toward the pen 2 via the uplink signal US at an arbitrary timing. For example, the arbitrary timing may be immediately after detection of the pen 2 by the sensor controller 31 or may be a timing after the elapse of a predetermined time period from the last reception of the transmission data MF from the sensor controller 31. Alternatively, the arbitrary timing may be a timing decided based on a random number, or may be a timing that periodically occurs, or may be a combination of two or more of these timings. After transmitting the reference value Ref, the sensor controller 31 skips step S24 until transmitting the next reference value Ref or until receiving the standard digital value MS. As a result, the reference value Ref continues to be stored in the internal memory of the sensor controller 31, and processing of restoring the N-bit internal digital value NA from the received transmission digital value MD of M−1 bits (=the relative digital value MR) by using the reference value Ref is executed in step S23 of FIG. 8.

FIG. 22 is a schematic block diagram illustrating functional blocks of the integrated circuit 27 according to the present embodiment. As illustrated in this diagram, the integrated circuit 27 according to the present embodiment is configured to functionally include a reception circuit 104, additionally. The reception circuit 104 is a functional unit that receives the uplink signal US through the antenna 22 and extracts the reference value Ref from the received uplink signal US to set the reference value Ref in the already-supplied internal digital value holding circuit 103.

The integrated circuit 27 according to the present embodiment carries out operation of supplying the internal digital value NA to the sensor device 3 according to the value held in the already-supplied internal digital value holding circuit 103. Specifically, until the reference value Ref is set in the already-supplied internal digital value holding circuit 103, the integrated circuit 27 executes the same processing as the first embodiment as illustrated in FIG. 21. However, once the reference value Ref is set in the already-supplied internal digital value holding circuit 103, afterward, step S11 of FIG. 4 is skipped as long as the processing is executed through step S10 of FIG. 4. As a result, while the relative digital value MR continues to be set as the transmission digital value MD, the already-supplied internal digital value NS continues to be the reference value Ref and, in step S4 of FIG. 4, the relative value between the reference value Ref and the internal digital value NA acquired in step S1 is acquired.

Due to the execution of the above processing by the pen 2 and the sensor device 3, generation of the relative value and restoration of the internal digital value NA are carried out based on the reference value Ref after the reference value Ref is transferred as illustrated in FIG. 21. This processing is particularly effective when a communication error has occurred as in the example illustrated in FIG. 21. Specifically, even when an error (discrepancy) occurs between the internal digital value NA acquired by the pen 2 and the internal digital value NA acquired by the sensor device 3 due to a communication error, the error (discrepancy) can be eliminated after transmission and reception of the reference value Ref.

As described above, according to the present embodiment, even when an error (discrepancy) occurs between the digital value acquired by the pen and the digital value acquired by the sensor device due to a communication error or the like, the error can be eliminated after transmission and reception of the reference value.

In the present embodiment, the example is described in which, once the reference value Ref is set in the already-supplied internal digital value holding circuit 103, afterward step S11 of FIG. 4 is skipped as long as the processing of the integrated circuit 27 is executed through step S10 of FIG. 4. However, the skipping of step S11 may be limited to one time of skipping immediately after the reference value Ref is set in the already-supplied internal digital value holding circuit 103. In this case, at the clock time $t_6$ in FIG. 21, for example, 1030 is set as the already-supplied internal digital value NS after transmission. In this case also, the same effect as the present embodiment can be achieved.

FIG. 23 is a flowchart illustrating processing executed by the integrated circuit 27 according to a fifth embodiment of the present disclosure. The present embodiment is different from the first embodiment in that the integrated circuit 27 can operate in two operation modes, and the sensor device 3 can switch the operation mode of the integrated circuit 27, and is the same as the first embodiment in other respects. In the following, the description will be continued with focus on the difference from the first embodiment.

The integrated circuit 27 according to the present embodiment is configured to operate in either a relative digital value use mode, in which operation is carried out as in FIG. 4, and a constant standard digital value use mode, in which the steps S3 to S5 of FIG. 4 are skipped and the processing of step S6 and the subsequent steps is always executed after step S1. Switching between them is carried out by using a command included in the uplink signal US from the sensor device 3.

The operation of the integrated circuit 27 will be described. As illustrated in FIG. 23, first the integrated circuit 27 receives the uplink signal US (step S70). Then, the integrated circuit 27 determines whether or not a command indicating the operation mode is included therein (step S71). If the command is not included, the integrated circuit 27 keeps the current operation mode and returns the processing to step S70. If the command is included, the integrated circuit 27 further determines which of the relative digital value use mode or the constant standard digital value use mode is indicated. If the relative digital value use mode is indicated, the integrated circuit 27 enters the relative digital value use mode (step S72). If the constant standard digital value use mode is indicated, the integrated circuit 27 enters the constant standard digital value use mode (step S73). Thereafter, the integrated circuit 27 returns the processing to step S70.

According to the present embodiment, the pen 2 can send the standard digital value MS according to a command from the sensor device 3 when the sensor device 3 needs the standard digital value MS. Therefore, for example, when an error occurs between the internal digital value NA acquired by the pen 2 and the internal digital value NA acquired by the sensor device 3 due to the occurrence of a communication error, the error can be immediately eliminated.

Although preferred embodiments of the present disclosure are described above, it is obvious that the present disclosure is not limited to such embodiments and the present disclosure can be implemented in various modes without departing from the scope of the present disclosure.

For example, in the above-described respective embodiments, the examples are described in which the internal digital value acquisition circuit 100 converts the state of the user operation tool 25 (including the writing pressure detector 23) to the N-bit internal digital value. However, the internal digital value acquisition circuit 100 may acquire the N-bit internal digital value from a factor or element other than the state of the user operation tool. For example, data transmitted from the pen 2 to implement setting of the sensor device 3 or the host computer 4 may be acquired as the N-bit internal digital value. This data can be supplied also based on M-bit transmission data (M<N). Thus, it becomes possible to further alleviate insufficiency of communication resources that can be used for communication between the pen 2 and the sensor device 3.

In the above-described respective embodiments, determination of whether or not to transmit the standard digital value MS is carried out on the side of the pen 2. However, this determination may be carried out also in the sensor controller 31, and the sensor controller 31 may cause the electronic pen 2 to transmit the standard digital value MS by using a command transmitted in the uplink signal US when the sensor controller 31 determines to cause the pen 2 to transmit the standard digital value MS. In this case, it is preferable for the sensor controller 31 to determine to cause the pen 2 to transmit the standard digital value MS if the standard digital value MS has never been received after detection of the pen 2, or when the standard digital value MS has not been received over a predetermined time, or the like. Furthermore, after causing the pen 2 to transmit the standard digital value MS, the sensor controller 31 may cause the transmission of the standard digital value MS to continue a predetermined number of times. This continuous transmission may be implemented through transmission of a command from the sensor controller 31 in every transmission, or may be implemented by configuring the pen 2 to autonomously transmit the standard digital value MS a predetermined number of times after having received a command requesting the transmission of the standard digital value MS.

DESCRIPTION OF REFERENCE SYMBOLS

1 Pen system
2 Pen
3 Sensor device
3t Touch surface
4 Host computer
20 Core body
21 Pen tip
22 Antenna
23 Writing pressure detector
24 Wheel user operation tool
25 User operation tool
26 Power supply
27 Integrated circuit
30 Sensor
31 Sensor controller
100 Internal digital value acquisition circuit
101 Transmission digital value acquisition circuit
102 Transmission circuit
103 Already-supplied internal digital value holding circuit
104 Reception circuit
A1 to A3 Stroke
DS Downlink signal
F, F1, F2 Identification flag
MD Transmission digital value
MF Transmission data
MM Medium-accuracy relative digital value
MR Relative digital value
MS Standard digital value
NA Internal digital value
OPS State
P Predicted value
Ref Reference value
US Uplink signal The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pen configured to supply an N-bit internal digital value to a sensor device, the pen comprising:
an integrated circuit that acquires a series of the internal digital values,
wherein
the series of the internal digital values include a first internal digital value and a second internal digital value acquired subsequently to the first internal digital value,
the integrated circuit supplies the first internal digital value to the sensor device by controlling transmission of first transmission data including a first standard digital value corresponding to the first internal digital value, and
the integrated circuit supplies the second internal digital value to the sensor device by controlling transmission of second transmission data that is smaller than N bits and includes an M-bit relative digital value (M<N) corresponding to a relative value between the first internal digital value obtained by restoration from the first standard digital value and the second internal digital value.

2. The pen according to claim 1, wherein
the integrated circuit includes an already-supplied internal digital value holding circuit that holds the first internal digital value restored from the first standard digital value, and
the relative value is a relative value between the second internal digital value and the first internal digital value held in the already-supplied internal digital value holding circuit.

3. The pen according to claim 2, wherein the relative value is a difference between the second internal digital value and the first internal digital value held in the already-supplied internal digital value holding circuit.

4. The pen according to claim 1, wherein the integrated circuit determines, based on the relative value, which of a second standard digital value corresponding to the second internal digital value, or the relative digital value, is to be set in the second transmission data.

5. The pen according to claim 4, wherein the integrated circuit determines to set the relative digital value in the second transmission data when the relative value is a numerical value that can be expressed with M bits, and determines to set the second standard digital value in the second transmission data when the relative value is a numerical value that cannot be expressed with M bits.

6. The pen according to claim 4, wherein the second standard digital value is an M-bit digital value obtained by compressing the second internal digital value.

7. The pen according to claim 6, wherein the integrated circuit determines to set the second standard digital value corresponding to the second internal digital value in the second transmission data irrespective of the relative value when the second internal digital value is allowed to be restored from the second standard digital value without an error.

8. The pen according to claim 1, wherein the integrated circuit determines, based on the relative value, which of the second standard digital value corresponding to the second internal digital value, the relative digital value that is the relative value expressed with L bits (L<M), or an medium-accuracy relative digital value that comprises L most significant bits of the relative value expressed with L+K bits (1≤K≤N−M) is to be set in the second transmission data.

9. The pen according to claim 8, wherein the integrated circuit determines to set the relative digital value in the second transmission data when the relative value is a numerical value allowed to be expressed with L bits, determines to set the medium-accuracy relative digital value in the second transmission data when the relative value is a numerical value that is not allowed to be expressed with L bits but allowed to be expressed with L+K bits, and determines to set the second standard digital value in the second transmission data when the relative value is a numerical value that is not allowed to be expressed with L+K bits.

10. The pen according to claim 9, wherein
when including the second standard digital value, the second transmission data further includes a first identification flag indicating a first value,
when including the medium-accuracy relative digital value, the second transmission data further includes the first identification flag indicating a second value different from the first value and a second identification flag indicating a third value, and
when including the relative digital value, the second transmission data further includes the first identification flag indicating the second value and the second identification flag indicating a fourth value different from the third value.

11. The pen according to claim 1, wherein
the integrated circuit includes an already-supplied internal digital value holding circuit that holds a reference value corresponding to the internal digital value that has been already supplied when the reference value is received from the sensor device, and
the integrated circuit carries out operation of supplying the internal digital value to the sensor device according to a value held in the already-supplied internal digital value holding circuit.

12. The pen according to claim 11, wherein the integrated circuit acquires the relative value based on the second internal digital value and the reference value held in the already-supplied internal digital value holding circuit.

13. The pen according to claim 1, wherein
the integrated circuit is configured to be capable of acquiring a predicted value of the internal digital value based on one or more of the internal digital values that have been already supplied to the sensor device, and
the integrated circuit acquires the relative value based on the second internal digital value and the predicted value.

14. A pen configured to supply an N-bit internal digital value to a sensor device, the pen comprising:
a user operation tool, and
an integrated circuit that is coupled to the user operation tool and that acquires a series of the internal digital values based on the user operation tool,
wherein
the integrated circuit receives a reference value corresponding to the internal digital value that has been already supplied from the sensor device and supplies a first internal digital value included in the series of the internal digital values to the sensor device by controlling transmission of transmission data that is smaller than N bits and includes an M-bit relative digital value (M<N) corresponding to a relative value between the first internal digital value and the reference value.

15. The pen according to claim 14, wherein the reference value is the internal digital value restored by the sensor device from the transmission data.

16. A pen system, comprising:
a pen that outputs an N-bit internal digital value, and
a sensor device,
wherein,
the pen includes an integrated circuit that acquires a series of the internal digital values, wherein the integrated circuit supplies a first internal digital value included in the series of the internal digital values to the sensor device by transmitting first transmission data including a standard digital value obtained by compressing the first internal digital value using a compression method, in which a quantization step becomes smaller when a value of the internal digital value is smaller, and
the sensor device is configured to restore the first internal digital value from the first transmission data and to output the first internal digital value.

17. The pen system according to claim 16, wherein the compression method includes converting a discrete value expressed with a relatively-large number of bits to a discrete value expressed with a relatively-small number of bits.

18. The pen system according to claim 16, wherein
the series of the internal digital values include a second internal digital value acquired subsequently to the first internal digital value, and
after transmitting the first transmission data, the integrated circuit supplies the second internal digital value to the sensor device by transmitting second transmission data that is smaller than N bits and includes an M-bit relative digital value (M<N) corresponding to a relative value between the second internal digital value and the first internal digital value obtained by restoration from the standard digital value.

* * * * *